United States Patent
Tian et al.

(10) Patent No.: US 12,294,423 B2
(45) Date of Patent: May 6, 2025

(54) MULTI-FUNCTIONAL RECONFIGURABLE INTELLIGENCE SURFACE INTEGRATING SIGNAL REFLECTION, REFRACTION AND AMPLIFICATION AND ENERGY HARVESTING AND APPLICATION THEREOF

(71) Applicant: Beijing University of Posts and Telecommunications, Beijing (CN)

(72) Inventors: Hui Tian, Beijing (CN); Wen Wang, Beijing (CN); Ping Zhang, Beijing (CN); Gaofeng Nie, Beijing (CN); Xue Rong, Beijing (CN); Wanli Ni, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 30 days.

(21) Appl. No.: 18/387,063

(22) Filed: Nov. 6, 2023

(65) Prior Publication Data
US 2024/0297684 A1    Sep. 5, 2024

(30) Foreign Application Priority Data
Feb. 22, 2023 (CN) .......................... 202310149565.5

(51) Int. Cl.
*H04B 7/04* (2017.01)
*H04B 7/0426* (2017.01)

(52) U.S. Cl.
CPC ......... *H04B 7/04013* (2023.05); *H04B 7/043* (2013.01)

(58) Field of Classification Search
CPC .. H04B 7/04013; H04B 7/043; H04B 7/0617; H04B 7/145; Y02D 30/70;
(Continued)

(56) References Cited

U.S. PATENT DOCUMENTS

| | | | |
|---|---|---|---|
| 9,911,290 B1* | 3/2018 | Zalewski | H04W 76/10 |
| 2015/0190189 A1* | 7/2015 | Yates | A61B 18/1206 |
| | | | 606/34 |

(Continued)

*Primary Examiner* — Emmanuel Bayard
(74) *Attorney, Agent, or Firm* — Bayramoglu Law Offices LLC

(57) ABSTRACT

A multi-functional reconfigurable intelligence surface (MF-RIS) integrating signal reflection, refraction and amplification and energy harvesting and an application thereof are provided. The MF-RIS can support wireless signal reflection, refraction and amplification and energy harvesting on one surface, to amplify, reflect, or refract a signal through harvested energy, and further enhance effective coverage of wireless signals. When a signal model of the MF-RIS constructed in the present disclosure is applied to a multi-user wireless network, a non-convex optimization problem of jointly designing operation modes and parameters that include BS transmit beamforming, and different components and a deployment position of the MF-RIS is constructed with an objective of maximizing a sum rate (SR) of a plurality of users in an MF-RIS-assisted non-orthogonal multiple access network. Then, an iterative optimization algorithm is designed to effectively solve the non-convex optimization problem, to maximize the SR of the plurality of users.

10 Claims, 2 Drawing Sheets

(58) Field of Classification Search
CPC .... H01Q 15/0086; H01Q 15/02; H01Q 15/14; G06F 30/20; G06F 2111/04; G06F 2111/10; H04W 16/18; H04W 24/02
USPC .......................................... 375/262, 295–97
See application file for complete search history.

(56) References Cited

U.S. PATENT DOCUMENTS

| | | | |
|---|---|---|---|
| 2017/0144495 A1* | 5/2017 | Darrer | B60C 23/0433 |
| 2017/0164581 A1* | 6/2017 | Deng | A01K 11/006 |
| 2017/0237466 A1* | 8/2017 | Carr | H02J 50/12 |
| | | | 455/41.1 |
| 2021/0351843 A1* | 11/2021 | Leon-Salas | H04B 10/806 |
| 2022/0385104 A1* | 12/2022 | Elshafie | H02J 50/001 |
| 2022/0385109 A1* | 12/2022 | Elshafie | H04W 4/20 |
| 2023/0300740 A1* | 9/2023 | Bok | H04W 52/02 |
| | | | 701/34.4 |

* cited by examiner

MULTI-FUNCTIONAL RECONFIGURABLE INTELLIGENCE SURFACE INTEGRATING SIGNAL REFLECTION, REFRACTION AND AMPLIFICATION AND ENERGY HARVESTING AND APPLICATION THEREOF

CROSS REFERENCE TO THE RELATED APPLICATIONS

This application is based upon and claims priority to Chinese Patent Application No. 202310149565.5, filed on Feb. 22, 2023, the entire contents of which are incorporated herein by reference.

TECHNICAL FIELD

The present disclosure relates to the technical field of wireless resource allocation, and in particular, to a modeling and optimization method for a multi-functional reconfigurable intelligence surface (MF-RIS) integrating signal reflection, refraction and amplification and energy harvesting.

BACKGROUND

A reconfigurable intelligence surface (RIS) or an intelligence reconfigurable surface (IRS) has become a potential development direction of future communication networks due to its advantages of improving energy efficiency and spectrum efficiency in a cost-effective manner. The RIS can establish a tunable communication environment by modifying a phase shift or an amplitude of an incident signal, to achieve various communication goals, such as improving throughput, enhancing security, and reducing transmission energy consumption. However, due to a hardware limitation, a traditional reflection-based single-functional RIS (SF-RIS) can achieve only half-space signal coverage. This greatly limits deployment flexibility and effectiveness of the RIS in a wireless network in which users are randomly distributed.

To overcome this limitation, dual-functional RIS (DF-RIS) structures, such as a simultaneous transmitting and reflecting RIS (STAR-RIS) and an intelligent omni-surface (IOS), have been proposed. The DF-RIS achieves full-space signal coverage by supporting both signal reflection and refraction, and creates a ubiquitous intelligent radio environment. However, both SF-RIS and DF-RIS-assisted communication links have a double fading phenomenon, and signal reception is seriously damaged.

To resolve the double fading phenomenon faced by an existing passive RIS, an active RIS structure is proposed. The active RIS achieves significant spectrum efficiency gains by embedding a power amplifier into the traditional SF-RIS and properly designing a phase shift and an amplification factor. In addition, there is another metasurface structure that supports signal amplification: a dynamic metasurface antenna (DMA). The DMA overcomes the serious path loss problem of the passive RIS by amplifying and phase-shifting an incident signal to different degrees, so as to implement an active large-scale antenna array. However, both the active RIS and the DMA require additional power consumption to maintain the operation of an active element. Consequently, performance implementation highly depends on an external power supply.

The foregoing RIS structures are all powered by batteries or a power grid. For a battery-powered RIS, an embedded battery provides only a limited lifetime and cannot support long-term operation of the RIS. Considering environmental hazards and hardware limitations, manual replacement of the battery of the RIS is costly and impractical. In addition, because power line networks are inaccessible in mountainous areas or the like, there are limited positions at which a grid-powered RIS can be deployed. Therefore, the present disclosure aims to develop a new RIS structure that achieves self-sustainability while maintaining the performance advantages of the RIS.

SUMMARY

In view of a fact that performance implementation of an existing RIS structure highly depends on an external power supply, the present disclosure provides an MF-RIS integrating signal reflection, refraction and amplification and energy harvesting. An incident signal can be reflected, transmitted, and amplified through energy harvested from a radio frequency (RF) signal. Therefore, the provided MF-RIS can not only maintain energy self-sufficiency, but also achieve full-space signal coverage and effectively reduce a path loss. All elements are capable of being flexibly switched between different working modes such that the MF-RIS provides more freedom for signal processing.

To achieve the foregoing objective, the present disclosure provides the following technical solutions:

According to one aspect, the present disclosure provides an MF-RIS integrating signal reflection, refraction and amplification and energy harvesting, having two working modes: an energy harvesting mode and a signal relay mode. In the signal relay mode, an incident signal is reflected and refracted through surface equivalent electrical impedance and magnetoimpedance elements. The incident signal is divided into two parts by controlling electric current and magnetic current through a microcontroller unit (MCU) chip. One part is reflected to reflection half-space and the other part is refracted to refraction half-space. A reflected signal and a refracted signal are amplified through an amplifier circuit. In the energy harvesting mode, RF energy is obtained from the incident signal and converted into direct current (DC) power through an impedance matcher, an RF-DC conversion circuit and a capacitor, and an energy management module controls energy to be stored in an energy storage apparatus or supplied for operation of a phase shifter and the amplifier circuit. A circuit connection is adjusted such that each element is capable of being flexibly switched between the energy harvesting mode and the signal relay mode.

According to another aspect, the present disclosure further provides application of the foregoing MF-RIS integrating signal reflection, refraction and amplification and energy harvesting in a multi-user wireless network, including the following steps:

S1: designing operation modes and parameters, including base station (BS) transmit beamforming, and different components and a deployment position of the MF-RIS, and constructing a mixed integer non-linear programming non-convex optimization problem and constraints with an objective of maximizing an achievable sum rate (SR) of all users;

S2: decomposing the non-convex problem constructed in S1 into three subproblems: a BS transmit beamforming optimization problem, an MF-RIS coefficient design problem, and an MF-RIS deployment optimization problem; and S3: performing alternating optimization (AO) on the subproblems obtained through decomposition in S2 to ensure that each sub-algorithm converges to a local optimum, which specifically includes: for the BS transmit beamforming optimization problem, introducing auxiliary variables and solving the BS transmit beamforming optimization problem through a sequential rank-one constraint relaxation (SROCR) method; for the MF-RIS coefficient design problem, introducing an auxiliary variable, replacing a non-convex objective function with its convex upper bound (CUB), processing an equality constraint through a penalty function method, and designing a coefficient of the MF-RIS; and for the MF-RIS deployment optimization problem, designing the position of the MF-RIS through a local area optimization method, and processing a non-convex term through successive convex approximation (SCA) to transform the MF-RIS deployment optimization problem into a solvable convex problem.

Further, the optimization problem and the constraints in S1 are as follows:

$$\max_{f_k, \Theta_k, w} \sum_k \sum_{j \in J_k} R_{j \to j}^k$$

$$s.t. \sum_k \|f_k\|^2 \leq P_{BS}^{max},$$

$$\Theta_k \in R_{mf}, \forall k \in K,$$

$$R_{j \to j}^k \geq R_{kj}^{min}, \forall k \in K, \forall j \in J_k,$$

$$w \in P = \{[x, y, z]^T \mid x_{min} \leq x \leq x_{max}, y_{min} \leq y \leq y_{max}, z_{min} \leq z \leq z_{max}\},$$

$$\frac{|\bar{h}_{kj} f_k|^2}{|\bar{h}_{kj} f_{\bar{k}}|^2 + |g_{kj}^H \Theta_k n_s|^2 + \sigma_u^2} \leq \frac{|\bar{h}_{kl} f_k|^2}{|\bar{h}_{kl} f_{\bar{k}}|^2 + |g_{kl}^H \Theta_k n_s|^2 + \sigma_u^2},$$

$$\forall k \in K, \forall j \in J_k, \forall l \in L_k,$$

$$R_{l \to j}^k \geq R_{j \to j}^k, \forall k \in K, \forall j \in J_k, \forall l \in L_k$$

$$2(P_b P_{DC}) \sum_m \alpha_m \left(M - \sum_m \alpha_m\right) P_C + \xi P_O \leq \sum_m P_m^A,$$

where a quantity of elements of the MF-RIS is M, a set of the elements of the MF-RIS is indexed as M={1, ..., M}, and m is an $m^{th}$ element in the set of the elements; a quantity of antennas is J, a space set is K={r,t}, a user set is J={1, 2, ..., J}, j is a $j^{th}$ element in the user set, $J_k$={1, 2, ..., $J_k$)} represents a user set in space K, $J_r \cup J_t$=J, and if k=t, $\bar{k}$=r; if k=r, $\bar{k}$=t, and a user j in the space K is indexed as $U_{kj}$; $\bar{h}_{kj}$=$h_{kj}^H$+$g_{kj}^H \Theta_k$H represents a combined channel vector from a BS to the user $U_{kj}$, $\Theta_k$ is the coefficient of the MF-RIS, and $R_{MF}$ is a feasible coefficient set of the MF-RIS; $R_{j \to j}^k$ is an achievable rate of an expected signal of the user $U_{kj}$, $R_{kj}^{min}$ represents a minimum quality of service requirement of the user $U_{kj}$, $f_k$ is a transmit beamforming vector of the space k, $P_{BS}^{max}$ represents maximum transmit power of the BS, P represents a predefined deployment area of the MF-RIS, considering a three-dimensional (3D) Cartesian coordinate system, positions of the BS, the MF-RIS, and the user $U_{kj}$ are respectively $w_b$=[$x_b$, $y_b$, $z_b$]$^T$, w=[x, y, z]$^T$, and $w_{kj}$=[$x_{kj}$, $y_{kj}$, 0]$^T$, and [$x_{min}$, $x_{max}$], [$y_{min}$, $y_{max}$], and [$z_{min}$, $z_{max}$] respectively represent candidate ranges along X, Y, and Z axes; $n_s$~CN (0,$\sigma_s^2 I_M$) represents amplified noise introduced at the MF-RIS with noise power $\sigma_s^2$ per unit, and $n_{kj}$~CN (0,$\sigma_u^2$) represents additive white Gaussian noise (AWGN) at the user $U_{kj}$ with power $\sigma_u^2$; a constant $a_m$ represents impact of a circuit sensitivity limitation on the $m^{th}$ element, and $P_b$, $P_{DC}$, $P_C$ respectively represent power consumed by each phase shifter, DC bias power consumed by the amplifier circuit, and power consumed by the RF-DC conversion circuit; and ξ is a reciprocal of an energy conversion coefficient, and $P_O$=$\Sigma_k(\|\Theta_k H \Sigma_k f_k\|^2 + \sigma_s^2\|\Theta_k I_M\|^2)$ represents output power of the MF-RIS.

Further, decomposing the non-convex problem into the three subproblems in S2 includes:

removing the constraint $R_{l \to j}^k \geq R_{j \to j}^k$, $\forall k \in K$, $\forall j \in J_k$, $\forall l \in L_k$, from the non-convex problem;

introducing a relaxation variable set $\Delta_0$={$A_{kj}$, $B_{kj}$, $\Gamma_{kj}$, $C_m$, $\zeta_m$} such that:

$$A_{kj}^{-1} = |\bar{h}_{kj} f_k|^2, B_{kj} = |\bar{h}_{kj} f_{\bar{k}}|^2 + |g_{kj}^H \Theta_k n_s|^2 + \sigma_u^2,$$

$$\Gamma_{kj} = A_{kj}^{-1} B_{kj}^{-1},$$

$$\sum_m C_m^{-1} = (W + \xi P_O)(1 - \Omega) Z^{-1} + M\Omega,$$

$$\zeta_m = P_m^{RF}$$

rewriting the constraints as:

$$A_{kj}^{-1} \leq |\bar{h}_{kj} f_k|^2, B_{kj} \geq |\bar{h}_{kj} f_{\bar{k}}|^2 + |g_{kj}^H \Theta_k n_s|^2 + \sigma_u^2,$$

$$\Gamma_{kj} \geq A_{kj}^{-1} B_{kj}^{-1}, \forall k \in K, \forall j \in J_k,$$

$$\Gamma_{kj} \leq A_{kl}^{-1} B_{kl}^{-1}, \forall k \in K, \forall j \in J_k, \forall l \in L_k,$$

$$(W + \xi P_O)(1 - \Omega) Z^{-1} + M\Omega \leq \sum_m C_m^{-1},$$

$$\zeta_m \leq P_m^{RF}, C_m \geq \exp(-a(\zeta_m - q)) + 1, \forall m,$$

where $W = 2(P_b + P_{DC}) \sum_m \alpha_m + \left(M - \sum_m \alpha_m\right) P_C$; and processing the non-convex constraints in the foregoing second formula through SCA;

and performing first-order Taylor expansion to obtain lower bounds of right-hand terms of $A_{kl}^{-1} B_{kl}^{-1}$ and $\Sigma_m C_m^{-1}$ at feasible points {$A_{kl}^{(l)}$, $B_{kl}^{(l)}$, $C_m^{(l)}$} in a $\ell^{th}$ iteration as follows:

$$\Gamma_{kl}^{lb} = \frac{1}{A_{kl}^{(l)} B_{kl}^{(l)}} - \frac{A_{kl} - A_{kl}^{(l)}}{(A_{kl}^{(l)})^2 B_{kl}^{(l)}} - \frac{B_{kl} - B_{kl}^{(l)}}{(B_{kl}^{(l)})^2 A_{kl}^{(l)}}, C^{lb} = \sum_m \left(\frac{2}{C_m^{(l)}} - \frac{C_m}{(C_m^{(l)})^2}\right)$$

In this way, the non-convex problem is decomposed into the three subproblems: the BS transmits beamforming optimization problem, the MF-RIS coefficient design problem, and the MF-RIS deployment optimization problem.

Further, in S3, for the BS transmit beamforming optimization problem, given {$\Theta_k$, w}, auxiliary variables $Q_{kj}$ and $C_{kj}$ are introduced to transform an objective function $$\max_{f_k, \Theta_k, w} \sum_k \sum_{j \in J_k} R_{j \to j}^k, Q_{kj} = R_{j \to j}^k \text{ and } C_{kj} = |\bar{h}_{kj} f_k|^2 P_{kj} + B_{kj},$$

a non-convex constraint $Q_{kj} \leq \log_2(1 + p_{kj} A_{kj}^{-1} C_{kj}^{-1})$ is processed through SCA, a lower bound of a right-hand term of the non-convex constraint is obtained in the $\ell^{th}$ iteration, $\bar{H}_{kj} = \bar{h}_{kj}^H \bar{h}_{kj}$ and $F_k = k_k f_k^H$ are defined, $F_k \succeq 0$ and rank($F_k$)=1, an auxiliary variable set $\Delta_1$={$A_{kj}$, $B_{kj}$, $C_{kj}$, $Q_{kj}$, $\Gamma_{kj}$, $C_m$, $\zeta_m$} and $$\overline{W} = \frac{(C^{lb} - M\Omega)Z}{(1-\Omega)\xi} - \frac{w}{\xi}$$

are introduced such that $\overline{W} \geq \Sigma_k \text{Tr}(\Theta_k(H(\Sigma_k F_k)H^H + \sigma_s^2 I_M) \Theta_k^H)$, a rank-one constraint $\text{rank}(F_k)=1, \forall k$ is replaced by a linear constraint $(f_k^{e,(\ell-1)})^H F_k^{(\ell)} f_k^{e,(\ell-1)} \geq w_k^{(\ell-1)} \text{Tr}(F_k^{(\ell)})$, $\forall k$, through the SROCR method, $w_k^{(\ell-1)} \in [0, 1]$ is a trace ratio parameter of $F_k$ in a $(\ell-1)^{th}$ iteration, $f_k^{e,(\ell-1)}$ is an eigenvector corresponding to a maximum eigenvalue of $F_k^{(\ell-1)}$, $F_k^{(\ell-1)}$ is a solution of $w_k^{(\ell-1)}$ in the $(\ell-1)^{th}$ iteration, and the BS transmit beamforming optimization problem is transformed into a convex semidefinite programming (SDP) problem.

Further, an algorithm for solving the convex SDP problem into which the BS transmit beamforming optimization problem is transformed includes: initializing feasible points $\{F_k^{(0)}, w_k^{(0)}\}$ and a step $\delta_1^{(0)}$, setting an iteration index $\ell_1 = 0$, and repeating the following steps until a stop criterion is satisfied: if the convex SDP problem is solvable, solving the convex SDP problem to update $F_k^{(\ell_1+1)}$, and updating $\delta_1^{(\ell_1+1)} = \delta_1^{(\ell_1)}$; otherwise, updating $$\delta_1^{(\ell_1+1)} = \frac{\delta_1^{(\ell_1)}}{2};$$

and updating $$w_k^{(\ell_1+1)} = \min\left(1, \frac{\lambda_{max}\left(F_k^{(\ell_1+1)}\right)}{Tr\left(F_k^{(\ell_1+1)}\right)} + \delta_1^{(\ell_1+1)}\right)$$

and $\ell_1 = \ell_1 + 1$, and ending the current iteration.

Further, in S3, for the MF-RIS coefficient design problem, given $\{f_k, w\}$, $H_{kj} = [\text{diag}(g_{kj}^H)]$, $v_k = [\alpha_1 \sqrt{\beta_1^k} e^{j\theta_1^k}, \alpha_2 \sqrt{\beta_2^k} e^{j\theta_2^k}, \ldots, \alpha_M \sqrt{\beta_M^k} e^{j\theta_M^k}]^H$, and $u_k = [v_k; 1]$ are defined; and $U_k = u_k u_k^H$ is defined, $U_k \succeq 0$, $\text{rank}(U_k)=1$, $[U]_{m,m} = \alpha_m^2 \beta_m^k$, $[U_k]_{M+1, M+1} = 1$, and the following equation is obtained:

$$|\tilde{h}_{kj} f_k|^2 = |h_{kj}^H + g_{kj}^H \Theta_k H) f_k|^2 = Tr(H_{kj} F_k H_{kj}^H U_k)$$

Similarly, $|g_{kj}^H \Theta_k n_s|^2 = Tr(G_{kj} U_k)$ and $P_O = \Sigma_k Tr(HU_k)$ are obtained.

The constraints on $A_{kj}$, $B_{kj}$, $C_{kj}$, $\overline{W}$ are rewritten as:

$$A_{k,j}^{-1} \leq Tr\left(\tilde{H}_{kj} F_k \tilde{H}_{kj}^H U_k\right), B_{kj} \geq Tr\left(\left(\tilde{H}_{kj} F_{\overline{k}} \tilde{H}_{kj}^H + \tilde{G}_{kj}\right) U_k\right) + \sigma_u^2,$$

$$C_{kj} \geq Tr\left(\tilde{H}_{kj} F_k \tilde{H}_{kj}^H U_k\right) P_{kj} + B_{kj}, \overline{W} \geq \sum_k Tr\left(\tilde{H} U_k\right)$$

A rank-one constraint $\text{rank}(U_k)=1, \forall k$ is approximated as $(u_k^{eig,(\ell-1)})^H U_k^{(\ell)} u_k^{eig,(\ell-1)} \geq v_k^{(\ell-1)} Tr(U_k^{(\ell)}), \forall k$. A binary constraint $\alpha_m \in \{0, 1\}, \forall m$ is equivalently transformed into $\alpha_m - \alpha_m^2 \leq 0, 0 \leq \alpha_m \leq 1$.

The constraint $\alpha_m - \alpha_m^2 \leq 0$ is processed through SCA. An auxiliary variable $\eta_m^k = \alpha_m^2 \beta_m^k$ is introduced, and a non-convex constraint $[U_k]_{m,m} = \alpha_m^2 \beta_m^k, \forall m,k$ is equivalently represented as $[U_k]_{m,m} = \eta_m^k$, $\eta_m^k = \alpha_m^2 \beta_m^k$. The equality constraint $\eta_m^k = \alpha_m^2 \beta_m^k$ is processed through a penalty function to transform the MF-RIS coefficient design problem into a penalty function method-based problem.

Further, an algorithm for solving the penalty function method-based problem includes: initializing feasible points $\{U_k^{(0)}, \sigma_k^{(0)}\}$, $\varepsilon > 1$, and a step $\delta_2^{(0)}$, and setting an iteration index $\ell_2 = 0$ and a maximum value of a penalty factor $\rho_{max}$; and repeating the following steps: if $\ell_2 \leq \ell_2^{max}$ and the problem is solvable, solving the problem to update $U_k^{(\ell_2+1)}$, and updating $\delta_2^{(\ell_2+1)} = \delta_2^{(\ell_2)}$; otherwise, updating $$\delta_2^{(\ell_2+1)} = \frac{\delta_2^{(\ell_2)}}{2};$$

updating $$v_k^{(\ell_2+1)} = \min\left(1, \frac{\lambda_{max}\left(U_k^{(\ell_2+1)}\right)}{Tr\left(U_k^{(\ell_2+1)}\right)} + \delta_2^{(\ell_2+1)}\right);$$

and if $\rho^{(\ell_2+1)} = \min\{\varepsilon \rho^{(\ell_2)}, \rho_{max}\}$, updating $\ell_2 = \ell_2 + 1$ and ending the current iteration; otherwise, reinitializing $U_k^{(0)}$ and letting $\varepsilon > 1$ and $\ell_2 = 0$ until a stop criterion is satisfied.

Further, in S3, for the MF-RIS deployment optimization problem, the position w of the MF-RIS is designed through the local area optimization method. $w^{(i-1)}$ is defined as a position of the MF-RIS obtained in an $(i-1)^{th}$ iteration. A position variable satisfies a constraint $\|w - w^{(i-1)}\| \leq \delta$. It is assumed that $\hat{H}^{(i-1)}$ and $\hat{g}_{kj}^{(i-1)}$ are obtained in the $(i-1)^{th}$ iteration. $\hat{H}^{(i-1)}$ and $\hat{g}_{kj}^{(i-1)}$ are respectively an array response and small-scale fading after the $(i-1)^{th}$ iteration from the BS to the MF-RIS and from the MF-RIS to the user $U_{kj}$. A constraint including $A_{kj}$, $B_{kj}$, $C_{kj}$, $d_{bs}^{\kappa_{bs}}$, $d_{bs}^{\kappa_{bs}}$ is re-expressed. An auxiliary variable set is introduced to replace complex terms of the constraint. A non-convex part of the constraint is approximated through SCA. A right-hand term of a non-convex constraint $r_{kj} \leq \overline{d}_{kj}^T \hat{H}_{kj} F_k \hat{H}_{kj}^H \overline{d}_{kj}$ is a convex term with respect to $\overline{d}_{kj}^T$. The constraint $r_{kj} \leq \overline{d}_{kj}^T \hat{H}_{kj} F_k \hat{H}_{kj}^H \overline{d}_{kj}$ is rewritten as a convex constraint $r_{kj} \leq -(\overline{d}_{kj}^{(\ell)})^T \hat{H}_{kj} F_k \hat{H}_{kj}^H \overline{d}_{kj}^{(\ell)} + 2\Re((\overline{d}_{kj}^{(\ell)})^T \hat{H}_{kj} F_k \hat{H}_{kj}^H \overline{d}_{kj})$, through first-order Taylor expansion. $\overline{d}_{kj}^{(\overline{d}_{kj}^{(\ell)})}$ is a feasible point in the $\ell^{th}$ iteration.

Further, an algorithm for solving the local area-based problem includes: initializing feasible points $\{w^{(0)}, t^{(0)}, t_{kj}^{(0)}, v^{(0)}\}$ and setting an iteration index $\ell_3 = 0$; and repeating the following steps: solving the problem to update $\{w^{(\ell_3+1)}, t^{(\ell_3+1)}, t_{kj}^{(\ell_3+1)}, v^{(\ell_3+1)}\}$ and updating $\ell_3 = \ell_3 + 1$ until a stop criterion is satisfied.

Compared with the prior art, the present disclosure has the following beneficial effects:

The MF-RIS integrating signal reflection, refraction and amplification and energy harvesting provided in the present disclosure has various signal processing functions, and can support wireless signal reflection, transmission/refraction, and amplification and energy harvesting on one surface, to amplify, reflect, or refract a signal through harvested energy, and further enhance effective coverage of wireless signals. The MF-RIS provided in the present disclosure can not only maintain energy self-sufficiency, but also achieve full-space signal coverage and effectively reduce a path loss. All elements is capable of being flexibly switched between different working modes such that the MF-RIS provides more freedom for signal processing. Integrating a plurality of signal processing functions on one surface, the provided MF-RIS can achieve performance gains of up to 23.4% compared with a traditional passive RIS and 98.8% compared with a traditional self-sufficient RIS.

In a signal model of the MF-RIS constructed in the present disclosure, the non-convex optimization problem of jointly designing the operation modes and parameters that include BS transmit beamforming, and different components and the deployment position of the MF-RIS, is constructed with an objective of maximizing an SR of a plurality of users in an MF-RIS-assisted non-orthogonal multiple access (NOMA) network. Then, an iterative optimization algorithm is designed to effectively solve the non-convex optimization problem, to maximize the SR of the plurality of users. In addition, deploying the MF-RIS closer to a transmitter facilitates energy harvesting and can bring higher performance gains.

BRIEF DESCRIPTION OF THE DRAWINGS

To describe the technical solutions in embodiments of the present application or in the prior art more clearly, the following briefly describes the accompanying drawings required for describing the embodiments. Apparently, the accompanying drawings in the following description show merely some embodiments of the present disclosure, and persons of ordinary skill in the art may still derive other accompanying drawings from these accompanying drawings.

DETAILED DESCRIPTION OF THE EMBODIMENTS

To better understand the technical solutions, the foregoing describes in detail a method in the present disclosure with reference to the accompanying drawings.

Figure 1:
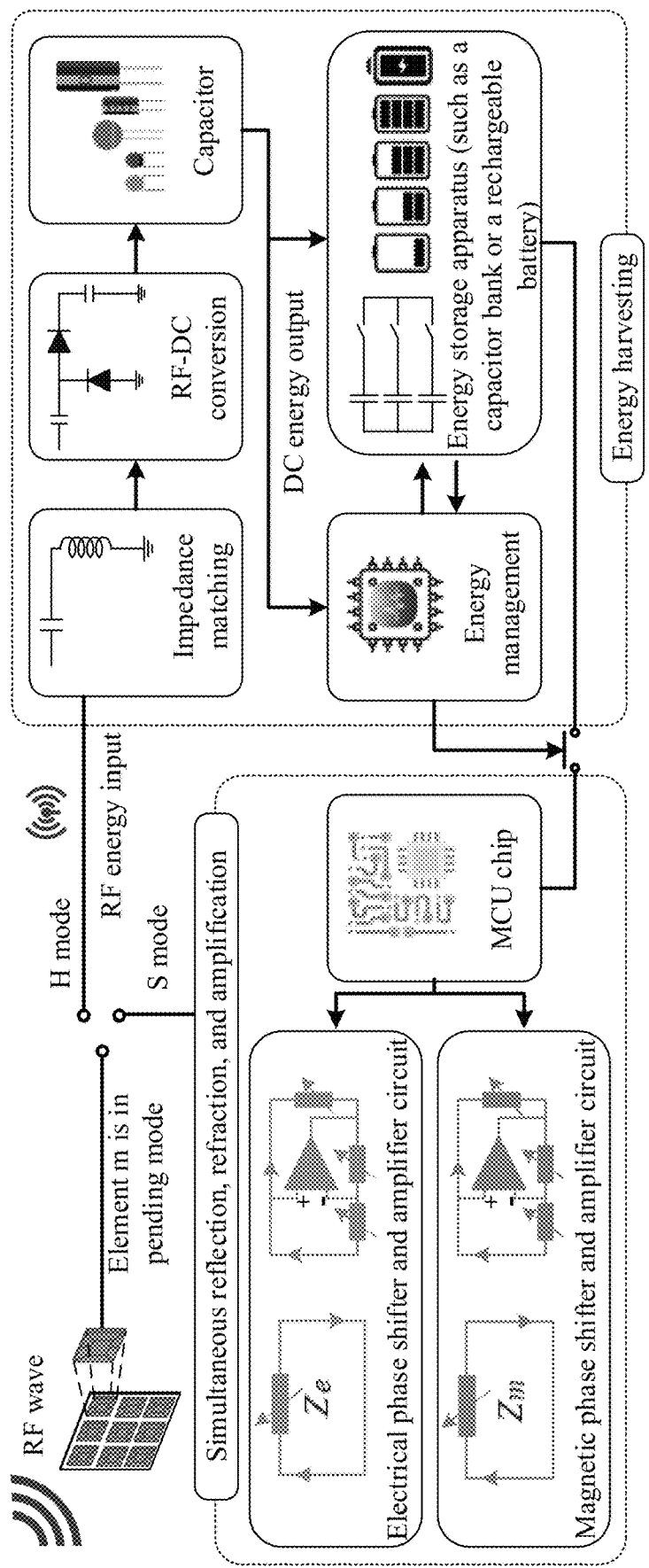
FIG. 1 is a schematic implementation diagram of an MF-RIS according to an embodiment of the present disclosure.

Referring to FIG. 1, the present disclosure provides an MF-RIS integrating signal reflection, refraction and amplification and energy harvesting, having two working modes: an energy harvesting mode (H mode) and a signal relay mode (S mode). In the signal relay mode, an incident signal is reflected and refracted through surface equivalent electrical impedance and magnetoimpedance elements. The incident signal is divided into two parts by controlling electric current and magnetic current through an MCU chip. One part is reflected to reflection half-space and the other part is refracted to refraction half-space. A reflected signal and a refracted signal are amplified through an amplifier circuit. In the energy harvesting mode, RF energy is obtained from the incident signal and converted into DC power through an impedance matcher, an RF-DC conversion circuit and a capacitor, and an energy management module controls energy to be stored in an energy storage apparatus or supplied for operation of a phase shifter and the amplifier circuit. A circuit connection is adjusted such that each element is capable of being flexibly switched between the energy harvesting mode and the signal relay mode. Because a switching frequency of positive and negative intrinsic diodes is up to 5 MHz, a mode switching time of the MF-RIS is negligible compared with a typical wireless channel coherence time (for example, 4.2 ms).

An energy harvesting circuit mainly relies on the following elements:

An impedance matching network composed of resonators with a high quality factor ensures maximum power transmission from an element to a rectifier block. The RF-DC conversion circuit rectifies available RF power into DC voltage. The capacitor is configured to ensure electric current is smoothly transmitted to the energy storage apparatus or used as a short-term reserve when RF energy is unavailable. The power management module decides whether to store the energy obtained through conversion or use the energy for signal reflection, transmission, and amplification. The energy storage apparatus (such as a rechargeable battery and a supercapacitor) is configured to store the energy. When harvested energy exceeds consumed energy, excess energy is stored for future use, to achieve continuous self-sufficiency.

For other elements working in the S mode, the incident signal is divided into the two parts by controlling the electric current and magnetic current. One part is reflected to the reflection half-space and the other part is refracted to the refraction half-space. With the help of the MCU, these elements can use the harvested energy to maintain the operation of the phase shifter and the amplifier circuit. Therefore, the provided MF-RIS does not require any external power supply in principle. Implementation of a reflect and transmit amplifier is also shown in FIG. 1. An operational amplifier-based electric current converter is configured to generate amplified reflect and transmit signals.

An MF-RIS structure integrating energy harvesting and signal reflection, refraction and amplification provided in the present disclosure can implement signal reflection, transmission or refraction, and amplification and energy harvesting. An implementation of the MF-RIS is also provided, and an operation protocol in an actual wireless network is designed for the MF-RIS.

Specifically, application of the MF-RIS provided in the present disclosure in a multi-user wireless network includes the following steps:

S1: A mixed integer non-linear programming non-convex problem of jointly designing operation modes and parameters that include BS transmit beamforming, and different components and a deployment position of the MF-RIS is constructed to maximize an SR of a plurality of users.

To characterize a signal model of the MF-RIS, it is considered that the MF-RIS has M elements. A set of the elements of the MF-RIS is indexed as M={1, ..., M}. $s_m$ represents a signal received by the $m^{th}$ element. Due to hardware limitations, it is considered that each element cannot simultaneously work in both the H and S modes. Therefore, signals harvested, reflected, and refracted by the $m^{th}$ element are modeled as follows:

$$y_m^h = (1-\alpha_m)s_m, \; y_m^r = \alpha_m\sqrt{\beta_m^r}e^{j\theta_m^r}s_m, \; y_m^t = \alpha_m\sqrt{\beta_m^t}e^{j\theta_m^t}s_m$$

$\alpha_m=\{0,1\}$, $\theta_m^r$, $\theta_m^t \in [0, 2\pi)$, $\beta_m^r$, $\beta_m^t \in [0, \beta_{max}]$ respectively represent an energy harvesting coefficient, and reflection and refraction phase shifts and their corresponding amplitudes. $\alpha_m=1$ represents that the $m^{th}$ element works in the S mode, and $\alpha_m=0$ represents that the element works in the H mode. $\beta_{max} \geq 1$ represents an amplification factor. According to a law of conservation of energy, the amplifier should not consume more energy than maximum available energy that can be provided by the MF-RIS, that is, $\beta_m^r + \beta_m^t \leq \beta_{max}$. Reflection and refraction coefficients of the MF-RIS are modeled as follows:

$$\Theta_r = \text{diag}(\alpha_1\sqrt{\beta_1^r}\,e^{j\theta_1^r}, \alpha_2\sqrt{\beta_2^r}\,e^{j\theta_2^r}, \ldots, \alpha_M\sqrt{\beta_M^r}\,e^{j\theta_M^r})$$

$$\Theta_t = \text{diag}(\alpha_1\sqrt{\beta_1^t}\,e^{j\theta_1^t}, \alpha_2\sqrt{\beta_2^t}\,e^{j\theta_2^t}, \ldots, \alpha_M\sqrt{\beta_M^t}\,e^{j\theta_M^t})$$

$$\alpha_m \in \{0,1\},\ \beta_m^r, \beta_m^t \in [0, \beta_{max}],\ \beta_m^r + \beta_m^t \leq \beta_{max},\ \theta_m^r, \theta_m^t \in [0, 2\pi)$$

An MF-RIS-assisted downlink NOMA network is considered. An N-antenna BS serves J single-antenna users with the help of an MF-RIS composed of M units. r(t) represents reflection (refraction) space. K={r,t} represents a space set, and J={1, 2, ..., J} represents a user set. $J_k=\{1, 2, \ldots, K_k\}$ represents a user set in space K. $J_r \cup J_t=J$. For symbol simplicity, a user J in the space K is indexed as $U_{kj}$.

Considering a 3D Cartesian coordinate system, positions of the BS, the MF-RIS, and the user $U_{kj}$ are respectively $w_b=[x_b, y_b, z_b]^T$, $w=[x, y, z]^T$, and $w_{kj}=[x_{kj}, y_{kj}, 0]^T$. Due to limited coverage of the MF-RIS, its deployable area is also limited. P represents a predefined deployment area of the MF-RIS, and the following constraint should be satisfied:

$$w \in P = \{[x, y, z]^T \mid x_{min} \leq x \leq x_{max}, y_{min} \leq y \leq y_{max}, z_{min} \leq z \leq z_{max}\},$$

$[x_{min}, x_{max}]$, $[y_{min}, y_{max}]$, and $[z_{min}, z_{max}]$ respectively represent candidate ranges along X, Y, and Z axes.

To characterize maximum performance that the MF-RIS can achieve, perfect channel state information for all channels is assumed to be available. Ricean fading modeling is performed for all channels. For example, a channel matrix $H \in \mathbb{C}^{M \times N}$ between the BS and the MF-RIS is as follows:

$$H = \underbrace{\sqrt{h_0 d_{bs}^{-\kappa_{bs}}}}_{L_{bs}} \underbrace{\left(\sqrt{\frac{\beta_{bs}}{\beta_{bs}+1}} H^{LoS} + \sqrt{\frac{1}{\beta_{bs}+1}} H^{NLoS}\right)}_{\hat{H}},$$

$L_{bs}$ is a distance-dependent path loss. $\hat{H}$ constitutes an array response and small scale fading. Specifically, $h_0$ is a path loss at a reference distance of 1 meter, $d_{bs}$ is a link distance between the BS and the MF-RIS, and $\kappa_{bs}$ is a corresponding path loss index. For small-scale fading, $\beta_{bs}$ is a Ricean factor, and $H^{NLoS}$ is a non-line-of-sight (NLOS) component that follows independent and identically distributed Rayleigh fading. It is assumed that the MF-RIS is parallel to a Y-Z plane. The M elements of the MF-RIS form an uniform rectangular array $M_y \times M_z = M$. A line-of-sight (LOS) component $H^{LoS}$ is expressed as follows:

$$H^{LoS} = \left[1, e^{-j\frac{2\pi}{\lambda}d\sin\varphi_r\sin\vartheta_r}, \ldots, e^{-j\frac{2\pi}{\lambda}(M_z-1)d\sin\varphi_r\sin\vartheta_r}\right]^T$$

$$\otimes \left[1, e^{-j\frac{2\pi}{\lambda}d\cos\varphi_r\sin\vartheta_r}, \ldots, e^{-j\frac{2\pi}{\lambda}(M_y-1)d\cos\varphi_r\sin\vartheta_r}\right]^T$$

$$\otimes \left[1, e^{-j\frac{2\pi}{\lambda}d\sin\varphi_r\cos\vartheta_r}, \ldots, e^{-j\frac{2\pi}{\lambda}(N-1)d\sin\varphi_r\cos\vartheta_r}\right],$$

An operator $\otimes$ represents a Kronecker product, $\lambda$ is a carrier wavelength, and d is an antenna distance. $\varphi_r$, $\vartheta_r$, $\varphi_t$, and $\vartheta_t$ respectively represent vertical and horizontal angles of arrival, and vertical and horizontal angles of departure. A channel vector $h_{kj}^H \in \mathbb{C}^{1 \times N}$ from the BS to the user $U_{kj}$ and a channel vector $g_{kj}^H \in \mathbb{C}^{1 \times M}$ from the MF-RIS to the user $U_{kj}$ can be obtained through a procedure similar to that for obtaining H, and are as follows:

$$h_{kj} = \underbrace{\sqrt{h_0 d_{bkj}^{-\kappa_{bkj}}}}_{L_{bkj}} \underbrace{\left(\sqrt{\frac{\beta_{bkj}}{\beta_{bkj}+1}} h_{bkj}^{LoS} + \sqrt{\frac{1}{\beta_{bkj}+1}} h_{bkj}^{NLoS}\right)}_{\hat{h}_{kj}},$$

$$g_{kj} = \underbrace{\sqrt{h_0 d_{skj}^{-\kappa_{skj}}}}_{L_{skj}} \underbrace{\left(\sqrt{\frac{\beta_{skj}}{\beta_{skj}+1}} g_{kj}^{LoS} + \sqrt{\frac{1}{\beta_{skj}+1}} g_{kj}^{NLoS}\right)}_{\hat{g}_{kj}}$$

To facilitate NOMA transmission, the BS transmits a superposed signal through a plurality of beamforming vectors, that is, $$s = \sum_k f_k \sum_{j \in J_k} \sqrt{p_{kj}} s_{kj}.$$

$f_k$ is a transmit beamforming vector of the space k. $p_{kj}$ is a power allocation factor for the user $U_{kj}$. $s_{kj} \in CN(0,1)$ represents a corresponding modulated data symbol, which is independent of k. Therefore, a signal received at the user $U_{kj}$ is as follows:

$$y_{kj} = \bar{h}_{kj} f_k \sqrt{p_{kj}} s_{kj} + \bar{h}_{kj} f_k \sum_{i \in \{J_k/j\}} \sqrt{p_{ki}} s_{ki} + \bar{h}_{kj} f_{\bar{k}} \sum_{i \in J_{\bar{k}}} \sqrt{p_{\bar{k}i}} s_{\bar{k}i} + g_{kj}^H \Theta_k n_s + n_{kj},$$

If k=t, $\bar{k}$=r. If k=r, $\bar{k}$=t. $n_s \sim CN(0, \sigma_s^2 I_M)$ represents amplified noise introduced at the MF-RIS with noise power $\sigma_s^2$ per unit. $n_{kj} \sim CN(0, \sigma_u^2)$ represents AWGN at the user $U_{kj}$ with noise power of $\sigma_u^2$. $\bar{h}_{kj} = h_{kj}^H + g_{kj}^H \Theta_k H$ represents a combined channel vector from the BS to the user $U_{kj}$.

According to a NOMA protocol, all users cancel interference through serial interference cancellation (SIC). It is assumed that equivalent combined channel gains of users in the space k in ascending order are expressed as follows:

$$\frac{|\bar{h}_{kj} f_k|^2}{|\bar{h}_{kj} f_{\bar{k}}|^2 + |g_{kj}^H \Theta_k n_s|^2 + \sigma_u^2} \leq \frac{|\bar{h}_{kl} f_k|^2}{|\bar{h}_{kl} f_{\bar{k}}|^2 + |g_{kl}^H \Theta_k n_s|^2 + \sigma_u^2},$$

$$\forall k \in K, \forall j \in J_k, \forall l \in L_k,$$

$L_k=\{j, j+1, \ldots, J_k\}$. Therefore, for any users $U_{kj}$ and $U_{kl}$ satisfying $j \leq l$, an achievable rate at which the user $U_{kl}$ decodes an expected signal of the user $U_{kj}$ is expressed as follows:

$$R_{l \to j}^k = \log_2\left(\frac{|\bar{h}_{kl} f_k|^2 p_{kj}}{|\bar{h}_{kl} f_k|^2 P_{kj} + |\bar{h}_{kl} f_{\bar{k}}|^2 + |g_{kl}^H \Theta_k n_s|^2 + \sigma_u^2}\right),$$

$$P_{kj} = \sum_{i=j+1}^{J_k} p_{ki}.$$

To ensure that SIC is successful, an achievable signal to interference plus noise ratio (SINR) when the user $U_{kl}$ decodes the signal of the user $U_{kj}$ should not be less than an achievable SINR when the user $U_{kj}$ decodes its own signal, where $j \leq l$. Therefore, there is the following SIC decoding rate constraint:

$$R_{l \to j}^k \geq R_{j \to j}^k, \forall k \in K, \forall j \in J_k, \forall l \in L_k$$

An energy harvesting coefficient matrix of the $m^{th}$ element is defined as $$T_m = \text{diag}\left(\left[\underbrace{0 \ldots}_{1\,to\,m-1}\ 1-\alpha_m\ \underbrace{\ldots 0}_{m+1\,to\,M}\right]\right).$$

RF power received at the $m^{th}$ element is expressed as follows:

$$P_m^{RF} = E(\|T_m(Hs + n_s)\|^2),$$

To capture a dynamic change of RF energy conversion efficiency at different input power levels, a non-linear energy harvesting model is used in the present disclosure. Therefore, total power harvested by the $m^{th}$ element is expressed as follows:

$$P_m^A = \frac{Y_m - Z\Omega}{1 - \Omega},\ Y_m = \frac{Z}{1 + e^{-a(P_m^{RF} - q)}},\ \Omega = \frac{1}{1 + e^{aq}},$$

$Y_m$ is a logical function of the received RF power $P_m^{RF}$. $Z \geq 0$ is a constant that determines maximum harvested power. A constant $\Omega$ is used to ensure zero input/zero output response in the H mode. Constants $a > 0$ and $q > 0$ represent combined effects of a circuit sensitivity limitation and electric current leakage. To achieve self-sustainability of the MF-RIS, the following energy constraint should be satisfied:

$$2(P_b + P_{DC})\sum_m \alpha_m + \left(M - \sum_m \alpha_m\right)P_C + \xi P_O \leq \sum_m P_m^A,$$

$P_b$, $P_{DC}$, $P_C$ respectively represent power consumed by each phase shifter, DC bias power consumed by the amplifier circuit, and power consumed by the RF-DC conversion circuit. $\xi$ is a reciprocal of an energy conversion coefficient. $P_O = \Sigma_k(\|\Theta_k H \Sigma_k f_k\|^2 + \sigma_s^2 \|\Theta_k I_M\|^2)$ represents output power of the MF-RIS.

An objective is to maximize the achievable SR of all users by jointly optimizing power allocation, BS transmit beamforming, the coefficient matrix, and a 3D position of the MF-RIS while maintaining self-sustainability of the MF-RIS. The following optimization problem is constructed:

$$\max_{f_k, \Theta_k, w} \sum_k \sum_{j \in J_k} R_{j \to j}^k$$

$$\text{s.t.}\ \sum_k \|f_k\|^2 \leq P_{BS}^{max},$$

$$\Theta_k \in R_{MF}, \forall k \in K,$$

$$R_{j \to j}^k \geq R_{kj}^{min}, \forall k \in K, \forall j \in J_k,$$

$$w \in P = \{[x, y, z]^T \mid x_{min} \leq x \leq x_{max}, y_{min} \leq y \leq y_{max}, z_{min} \leq z \leq z_{max}\},$$

$$\frac{|\bar{h}_{kj} f_k|^2}{|\bar{h}_{kj} f_{\bar{k}}|^2 + |g_{kj}^H \Theta_k n_s|^2 + \sigma_u^2} \leq \frac{|\bar{h}_{kl} f_k|^2}{|\bar{h}_{kl} f_{\bar{k}}|^2 + |g_{kl}^H \Theta_k n_s|^2 + \sigma_u^2},$$

$$\forall k \in K, \forall j \in J_k, \forall l \in L_k,$$

$$R_{l \to j}^k \geq R_{j \to j}^k, \forall k \in K, \forall j \in J_k, \forall l \in L_k$$

$$2(P_b + P_{DC})\sum_m \alpha_m \left(M - \sum_m \alpha_m\right)P_C + \xi P_O \leq \sum_m P_m^A,$$

$P_{BS}^{max}$ represents maximum transmit power of the BS. $R_{kj}^{min}$ represents a minimum quality of service requirement of the user $U_{kj}$.

$R_{MF} = \{\alpha_m, \beta_m^k, \theta_m^k | \alpha_m \in \{0, 1\}, \beta_m^k \in [0, \beta_{max}], \Sigma_k \beta_m^k \leq \beta_{max}, \theta_m^k \in [0, 2\pi), \forall m, k\}$ is a feasible coefficient set of the MF-RIS. The constraint $\Sigma_k \|f_k\|^2 \leq O_{BS}^{max}$ limits total transmit power of the BS.

S2: The non-convex problem constructed in S1 is transformed into a more tractable form, and an AO-based algorithm is proposed to effectively find a high-performance suboptimal solution. The non-convex problem is decomposed into three subproblems: a BS transmit beamforming optimization problem, an MF-RIS coefficient design problem, and an MF-RIS deployment optimization problem.

Before the original problem is solved, the original problem is transformed into the more tractable form. First, the constraint $R_{l \to j}^k \geq R_{j \to j}^k, \forall k \in K, \forall j \in J_k, \forall l \in L_k$ is a necessary condition of the following inequality:

$$\frac{|\bar{h}_{kj} f_k|^2}{|\bar{h}_{kj} f_{\bar{k}}|^2 + |g_{kj}^H \Theta_k n_s|^2 + \sigma_u^2} \leq \frac{|\bar{h}_{kl} f_k|^2}{|\bar{h}_{kl} f_{\bar{k}}|^2 + |g_{kl}^H \Theta_k n_s|^2 + \sigma_u^2},$$

$\forall k \in K, \forall j \in J_k, \forall l \in L_k$,

Specifically, according to the foregoing inequality, the equivalent combined channel gains of the users $U_{kj}$ and $U_{kl}$ whose decoding orders $j \leq l$ satisfy the following condition:

$$|\bar{h}_{kj} f_{\bar{k}}|^2(|\bar{h}_{kl} f_{\bar{k}}|^2 + |g_{kj}^H \Theta_k n_s|^2 + \sigma_u^2) \leq |\bar{h}_{kl} f_{\bar{k}}|^2(|\bar{h}_{kj} f_{\bar{k}}|^2 + |g_{kj}^H \Theta_k n_s|^2 + \sigma_u^2)$$

Both sides of the inequality are multiplied by $p_{kj}$, and $p_{kj}|\bar{h}_{kl} f_2|^2 |\bar{h}_{kj} f_k|^2\ P_{kj}$ is added to both sides. An equivalent transformation is performed to obtain the following inequality:

$$\frac{|\bar{h}_{kj} f_k|^2 p_{kj}}{|\bar{h}_{kj} f_{\bar{k}}|^2 P_{kj} + |\bar{h}_{kj} f_{\bar{k}}|^2 + |g_{kj}^H \Theta_k n_s|^2 + \sigma_u^2} \leq$$

$$\frac{|\bar{h}_{kl} f_k|^2 p_{kj}}{|\bar{h}_{kl} f_{\bar{k}}|^2 P_{kj} + |\bar{h}_{kl} f_{\bar{k}}|^2 + |g_{kl}^H \Theta_k n_s|^2 + \sigma_u^2}$$

Apparently, the foregoing inequality ensures that the constraint $R_{l \to j}^k \geq R_{j \to j}^k, \forall k \in K, \forall j \in J_k, \forall l \in L_k$ is satisfied. Therefore, when the constraint $$\frac{|\bar{h}_{kj}f_k|^2}{|\bar{h}_{kj}f_{\bar{k}}|^2 + |g_{kj}^H\Theta_k n_s|^2 + \sigma_u^2} \leq \frac{|\bar{h}_{kl}f_k|^2}{|\bar{h}_{kl}f_{\bar{k}}|^2 + |g_{kl}^H\Theta_k n_s|^2 + \sigma_u^2},$$

$\forall k \in K$, $\forall j \in J_k$, $\forall l \in L_k$ exists, removing the constraint $R_{l \to j}^k \geq R_{j \to j}^k$, $\forall k \in K$, $\forall j \in J_k$, $\forall l \in L_k$ does not affect optimality of the original problem. Therefore, the constraint $R_{l \to j}^k \geq R_{j \to j}^k$, $\forall k \in K$, $\forall j \in J_k$, $\forall l \in L_k$ can be removed from the original problem.

Next, to process the following highly coupled constraints:

$$|\bar{h}_{kj}f_k|^2(|\bar{h}_{kl}f_{\bar{k}}|^2 + |g_{kl}^H\Theta_k n_s|^2 + \sigma_u^2) \leq |\bar{h}_{kl}f_k|^2(|\bar{h}_{kj}f_{\bar{k}}|^2 + |g_{kj}^H\Theta_k n_s|^2 + \sigma_u^2)$$

$$2(P_b + P_{DC})\sum_m \alpha_m \left(M - \sum_m \alpha_m\right)P_C + \xi P_O \leq \sum_m P_m^A$$

A relaxation variable set $\Delta_0 = \{A_{kj}, B_{kj}, \Gamma_{kj}, C_m, \zeta_m\}$ is introduced such that:

$$A_{kj}^{-1} = |\bar{h}_{kl}f_k|^2, B_{kj} = |\bar{h}_{kj}f_{\bar{k}}|^2 + |g_{kl}^H\Theta_k n_s|^2 + \sigma_u^2,$$

$$\Gamma_{kj} = A_{kj}^{-1}B_{kj}^{-1},$$

$$\sum_m C_m^{-1}(W + \xi P_O)(1-\Omega)Z^{-1} + M\Omega,$$

$$\zeta_m = P_m^{RF}$$

With these variable definitions, the foregoing two constraints are rewritten as follows:

$$A_{kj}^{-1} \leq |\bar{h}_{kl}f_k|^2, B_{kj} \geq |\bar{h}_{kj}f_{\bar{k}}|^2 + |g_{kl}^H\Theta_k n_s|^2 + \sigma_u^2,$$

$$\Gamma_{kj} \geq A_{kj}^{-1}B_{kj}^{-1}, \forall k \in K, \forall j \in J_k,$$

$$\Gamma_{kj} \leq A_{kj}^{-1}B_{kj}^{-1}, \forall k \in K, \forall j \in J_k, \forall l \in L_k,$$

$$(W + \xi P_O)(1-\Omega)Z^{-1} + M\Omega \leq \sum_m C_m^{-1},$$

$$\zeta_m \leq P_m^{RF}, C_m \geq \exp(-a(\zeta_m - q)) + 1, \forall m,$$

$W = 2(P_b + P_{DC})\Sigma_m \alpha_m + (M - \Sigma_m \alpha_m)P_C$. The constraints in the foregoing second formula are non-convex because right-hand terms of the constraints are convex. The constraints are processed through SCA. Based on a fact that first-order Taylor expansion of a convex function is a global underestimation measure, lower bounds of the right-hand terms at feasible points $\{A_{kl}^{(\ell)}, B_{kl}^{(\ell)}, C_m^{(\ell)}\}$ in an $\ell^{th}$ iteration are expressed as follows:

$$\Gamma_{kl}^{lb} = \frac{1}{A_{kl}^{(\ell)}B_{kl}^{(\ell)}} - \frac{A_{kl} - A_{kl}^{(\ell)}}{(A_{kl}^{(\ell)})^2 B_{kl}^{(\ell)}} - \frac{B_{kl} - B_{kl}^{(\ell)}}{(B_{kl}^{(\ell)})^2 A_{kl}^{(\ell)}},$$

$$C^{lb} = \sum_m \left(\frac{2}{C_m^{(\ell)}} - \frac{C_m}{(C_m^{(\ell)})^2}\right)$$

As a result, the original problem is equivalently transformed into the following problems:

$$\max_{f_k, \Theta_k, w, \Delta_0} \sum_k \sum_{j \in J_k} R_{j \to j}^k$$

s.t. $\Gamma_{kl} \leq \Gamma_{kl}^{lb}, \forall k \in K, \forall j \in J_k, \forall l \in L_k,$ $(W + \xi P_O)(1-\Omega)Z^{-1} + M\Omega \leq C^{lb},$ $w \in P = \{[x, y, z]^T \mid x_{min} \leq x \leq x_{max}, y_{min} \leq y \leq y_{max}, z_{min} \leq z \leq z_{max}\},$ $$\sum_k \|f_k\|^2 \leq P_{BS}^{max},$$

$\Theta_k \in R_{MF}, \forall k \in K,$ $R_{j \to j}^k \geq R_{kj}^{min}, \forall k \in K, \forall j \in J_k,$ $A_{kj}^{-1} \leq |\bar{h}_{kl}f_k|^2, B_{kj} \geq |\bar{h}_{kj}f_{\bar{k}}|^2 + |g_{kl}^H\Theta_k n_s|^2 + \sigma_u^2,$ $\Gamma_{kj} \geq A_{kj}^{-1}B_{kj}^{-1}, \forall k \in K, \forall j \in J_k,$ $\zeta_m \leq P_m^{RF}, C_m \geq \exp(-a(\zeta_m - q)) + 1, \forall m,$ Then, the three subproblems are solved one by one.

S3: For the BS transmit beamforming optimization problem in S2, auxiliary variables are introduced and the BS transmit beamforming optimization problem is solved through an SROCR method.

First, for the BS transmit beamforming optimization problem, given $\{\Theta_k, w\}$, an objective is to solve the transmit beamforming vector $f_k$. Due to the non-concave objective function $$\max_{f_k, \Theta_k, w} \sum_k \sum_{j \in J_k} R_{j \to j}^k$$

and the non-convex constraint $R_{j \to j}^k \geq R_{kj}^{min}$, $\forall k \in K$, $\forall j \in J_k$, the original problem is still difficult to be directly solved. In view of this, auxiliary variables $Q_{kj}$ and $C_{kj}$ are introduced, where $Q_{kj} = R_{j \to j}^k$ and $C_{kj} = |\bar{h}_{kj}f_k|^2 P_{kj} + B_{kj}$. The objective function $$\max_{f_k, \Theta_k, w} \sum_k \sum_{j \in J_k} R_{j \to j}^k$$

is transformed into:

$$\sum_k \sum_{j \in J_k} R_{j \to j}^k = \sum_k \sum_{j \in J_k} Q_{kj}$$

In addition, the following new constraints are obtained:

$$C_{kj} \geq |h_{kj}f_k|^2 P_{kj} + B_{kj},$$

$$Q_{kj} \leq \log_2(1 + p_{kj}A_{kj}^{-1}C_{kj}^{-1}),$$

$$Q_{kj} \geq R_{kj}^{min}$$

The following non-convex constraint is processed through SCA:

$$Q_{kj} \leq \log_2(1 + p_{kj}A_{kj}^{-1}C_{kj}^{-1})$$

Specifically, in the $\ell^{th}$ iteration, a lower bound of a right-hand term of the constraint is expressed as follows:

$$R_{kj}^{lb} = \log_2\left(1 + \frac{p_{kj}}{A_{kj}^{(\ell)} C_{kj}^{(\ell)}}\right) - \frac{p_{kj}(\log_2 e)(A_{kj} - A_{kj}^{(\ell)})}{p_{kj} A_{kj}^{(\ell)} + (A_{kj}^{(\ell)})^2 C_{kj}^{(\ell)}} - \frac{p_{kj}(\log_2 e)(C_{kj} - C_{kj}^{(\ell)})}{p_{kj} C_{kj}^{(\ell)} + (C_{kj}^{(\ell)})^2 A_{kj}^{(\ell)}}$$

Next, $\bar{H}_{kj} = \bar{\mathbf{h}}_{kj} \bar{\mathbf{h}}_{kj}^H$ and $F_k = f_k f_k^H$ are defined. $F_k \succeq 0$ and rank$(F_k) = 1$. Then, the transmit beamforming vector is optimized by solving the following problem:

$$\max_{F_k, \Delta_1} \sum_k \sum_{j \in J_k} Q_{kj}$$

s.t. rank$(F_k) = 1, \forall k$, $$\sum_k Tr(F_k) \le P_{BS}^{max}, F_k \succeq 0, \forall k,$$

$A_{kj}^{-1} \le Tr(\bar{H}_{kj} F_k), B_{kj} \ge Tr(\bar{H}_{kj} F_{\bar{k}}) + |g_{kj}^H \Theta_k n_s|^2 + \sigma_u^2, \forall k \in K, \forall j \in J_k,$ $C_{kj} \ge Tr(\bar{H}_{kj} F_k) P_{kj} + B_{kj}, \forall k \in K, \forall j \in J_k,$ $\Gamma_{kj} \ge A_{kj}^{-1} B_{kj}^{-1}, \Gamma_{kj} \le \Gamma_{kl}^{lb}, Q_{kj} \le R_{kj}^{lb}, Q_{kj} \ge R_{kj}^{min}, \forall k \in K, \forall j \in J_k, \forall l \in L_k,$ $C_m \ge \exp(-a(\zeta_m - q)) + 1, \forall m,$ $\bar{W} \ge \sum_k Tr\left(\Theta_k\left(H\left(\sum_k F_k\right)H^H + \sigma_s^2 I_M\right)\Theta_k^H\right),$ $\zeta_m \le Tr\left(T_m H\left(\sum_k F_k\right)H^H T_m^H\right) + \sigma_s^2(1 - \alpha_m) \forall m,$ An auxiliary variable set $\Delta_1 = \{A_{kj}, B_{kj}, C_{kj}, Q_{kj}, \Gamma_{kj}, C_m, \zeta_m\}$ and $$\bar{W} = \frac{(Cb^{lb} - M\Omega)Z}{(1 - \Omega)\xi} - \frac{W}{\xi}$$

are used. The main difficulty in solving the foregoing problem lies in the rank-one constraint rank$(F_k) = 1, \forall k$. The constraint is processed through the SROCR method. A basic idea of the SROCR method is to gradually relax the rank-one constraint to find a feasible rank-one solution.

Specifically, $w_k^{(\ell-1)} \in [0, 1]$ is defined as a trace ratio parameter of $F_k$ in a $(\ell-1)^{th}$ iteration. The rank-one constraint rank$(F_k) = 1, \forall k$ in the $\ell^{th}$ iteration may be replaced by the following linear constraint:

$$(f_k^{e,(\ell-1)})^H F_k^{(\ell)} f_k^{e,(\ell-1)} \ge w_k^{(\ell-1)} Tr(F_k^{(\ell)}), \forall k,$$

$f_k^{e,(\ell-1)}$ is an eigenvector corresponding to a maximum eigenvalue of $F_k^{(\ell-1)}$. $F_k^{(\ell-1)}$ is a solution of given $w_k^{(\ell-1)}$ in the $(\ell-1)^{th}$ iteration. Therefore, the problem is transformed into:

$$\max_{F_k, \Delta_1} \sum_k \sum_{j \in J_k} Q_{kj}$$

s.t $\sum_k Tr(F_k) \le P_{BS}^{max}, F_k \succeq 0, \forall k,$ $A_{kj}^{-1} \le Tr(\bar{H}_{kj} F_k), B_{kj} \ge Tr(\bar{H}_{kj} F_{\bar{k}}) + |g_{kj}^H \Theta_k n_s|^2 + \sigma_u^2, \forall k \in K, \forall j \in J_k,$ $C_{kj} \ge Tr(\bar{H}_{kj} F_k) P_{kj} + B_{kj}, \forall k \in K, \forall j \in J_k,$ $\Gamma_{kj} \ge A_{kj}^{-1} B_{kj}^{-1}, \Gamma_{kj} \le \Gamma_{kl}^{lb}, Q_{kj} \le R_{kj}^{lb}, Q_{kj} \le R_{kj}^{min}, \forall k \in K, \forall j \in J_k, \forall l \in L_k,$ $C_m \ge \exp(-a(\zeta_m - q)) + 1, \forall m,$ -continued $\bar{W} \ge \sum_k Tr\left(\Theta_k\left(H\left(\sum_k F_k\right)H^H + \sigma_s^2 I_M\right)\Theta_k^H\right),$ $\zeta_m \le Tr\left(T_m H\left(\sum_k F_k\right)H^H T_m^H\right) + \sigma_s^2(1 - \alpha_m) \forall m,$ $(f_k^{e,(\ell-1)})^H F_k^{(\ell)} f_k^{e,(\ell-1)} \ge w_k^{(\ell-1)} Tr(F_k^{(\ell)}), \forall k,$ The problem is an SDP problem and can be effectively solved through CVX. The rank-one solution is gradually approached by iteratively increasing $w_k^{(\ell-1)}$ from 0 to 1. The following describes an iterative algorithm for solving the problem. After the problem is solved, Cholesky decomposition is performed on $F_k$ to obtain a solution of $f_k$, that is, $F_k^{(\ell-1)} = f_k f_k^H$.

The algorithm for solving the problem through the SROCR method includes: Initialize feasible points $\{F_k^{(0)}, w_k^{(0)}\}$ and a step $\delta_1^{(0)}$. Set an iteration index $\ell_1 = 0$. Repeat the following steps until a stop criterion is satisfied: If the foregoing SDP problem is solvable, solve the problem to update $F_k^{(\ell_1+1)}$, and update $\delta_1^{(\ell_1+1)} = \delta_1^{(\ell_1)}$; otherwise, update $$\delta_1^{(\ell_1+1)} = \frac{\delta_1^{(\ell_1)}}{2}.$$

Update $$w_k^{(\ell_1+1)} = \min\left(1, \frac{\lambda_{max}\left(F_k^{(\ell_1+1)}\right)}{Tr\left(F_k^{(\ell_1+1)}\right)} + \delta_1^{(\ell_1+1)}\right)$$

and $\ell_1 = \ell_1 + 1$, and end the current iteration.

S4: For the MF-RIS coefficient design problem in S2, an auxiliary variable is introduced, a non-convex objective function is replaced by its CUB, an equality constraint is processed through a penalty function method, and the coefficient of the MF-RIS is designed.

For any given $\{f_k, w\}$, $v_k = [\alpha_1 \sqrt{\beta_1^k} e^{j\theta_1^k}, \alpha_2 \sqrt{\beta_2^k} e^{j\theta_2^k}, \ldots, \alpha_M \sqrt{\beta_M^k} e^{j\theta_M^k}]^H$ is used to represent $\tilde{H}_{kj} = [\text{diag}(g_{kj}^H)H; h_{kj}^H]$, and $u_k = [v x_k; 1]$. $U_k = u_k u_k^H$ is further defined. $U_k \succeq 0$, rank$(U_k) = 1$ and $[U_k]_{m,m} = \alpha_m^2 \beta_m^k$, $[U_k]_{M+1, M+1} = 1$. The following equation holds:

$$|\bar{h}_{kj} f_{kj}|^2 = |(h_{kj}^H + g_{kj}^H \Theta_k H) f_k|^2 = Tr(\tilde{H}_{kj} F_k \tilde{H}_{kj}^H U_k)$$

Similarly, the following equations are obtained:

$$|g_{kj}^H \Theta_k n_s|^2 = Tr(\tilde{G}_{kj} U_k) \text{ and}$$

$$P_O = \sum_k Tr(\tilde{H} U_k)$$

where $$\tilde{G}_{kj} = \tilde{g}_{kj} \tilde{g}_{kj}^H, \tilde{H} = \tilde{h} \tilde{h}^H + \sigma_s^2 \tilde{I}_M \tilde{I}_M^H$$

$$\tilde{g}_{kj} = [\text{diag}(g_{kj}^H) n_s; 0], \tilde{h} = [Hs; 0], \tilde{I}_M = [I_M; 0_{1 \times M}]$$

Then, the following constraints are rewritten:

$$A_{kj}^{-1} \leq Tr(\bar{H}_{kj}, F_k), B_{kj} \geq Tr(\bar{H}_{k\bar{j}}F_{\bar{k}}) + |g_{kj}^H \Theta_k n_s|^2 + \sigma_u^2, \forall k \in K, \forall j \in J_k,$$

$$C_{kj} \geq Tr(\bar{H}_{kj}F_k)P_{kj} + B_{kj}, \forall k \in K, \forall j \in J_k,$$

$$\bar{W} \geq \sum_k Tr\left(\Theta_k\left(H\left(\sum_k F_k\right)H^H + \sigma_s^2 I_M\right)\Theta_k^H\right),$$

The foregoing constraints are rewritten as:

$$A_{kj}^{-1} \leq Tr(\tilde{H}_{kj}F_k\tilde{H}_{kj}^H U_k), B_{kj} \geq Tr\left((\tilde{H}_{kj}F_{\bar{k}}\tilde{H}_{kj}^H + \tilde{G}_{kj})U_k\right) + \sigma_u^2,$$

$$C_{kj} \geq Tr(\tilde{H}_{kj}F_k\tilde{H}_{kj}^H U_k)P_{kj} + B_{kj}, \bar{W} \geq \sum_k Tr(\tilde{H} U_k)$$

Therefore, the MF-RIS coefficient design problem is simplified to:

$$\max_{U_k, \Delta_1} \sum_k \sum_{j \in J_k} Q_{kj}$$

s.t. $U_k \succeq 0$, $[U_k]_{M+1,M+1} = 1, \forall k$, $[U_k]_{m,m} = \alpha_m^2 \beta_m^k, \forall m, k$, rank$(U_k) = 1, \forall k$, $\alpha_m \in \{0, 1\}, \forall m$, $\beta_m^k \in [0, \beta_{max}], \sum_k \beta_m^k \leq \beta_{max}, \forall m, k$, $\Gamma_{kj} \geq A_{kj}^{-1} B_{kj}^{-1}, \Gamma_{kj} \leq \Gamma_{kl}^{lb}, Q_{kj}, \leq R_{kj}^{lb}$, $Q_{kj} \geq R_{kj}^{min}, \forall k, \in K, \forall j \in J_k, \forall l \in L_k$, $C_m \geq \exp(-a(\zeta_m - q)) + 1, \forall m$, $\zeta_m \leq Tr\left(T_m H\left(\sum_k F_k\right)H^H T_m^H\right) + \sigma_s^2(1 - \alpha_m), \forall m$, $A_{kj}^{-1} \leq Tr(\tilde{H}_{kj}F_k\tilde{H}_{kj}^H U_k), B_{kj} \geq Tr\left((\tilde{H}_{kj}F_{\bar{k}}\tilde{H}_{kj}^H + \tilde{G}_{kj})U_k\right) + \sigma_u^2,$ $C_{kj} \leq Tr(\tilde{H}_{kj}F_k\tilde{H}_{kj}^H U_k)P_{kj} + B_{kj}, \bar{W} \geq \sum_k Tr(\tilde{H} U_k)$ Non-convexity of the problem is derived from the non-convex constraint $[U_k] = \alpha_m^2 \beta_m^k, \forall m, k$, rank-one constraint rank$(U_k)=1, \forall k$, and binary constraint $\alpha_m = \{0, 1\}, \forall m$. The foregoing shows how to process the rank-one constraint through the SROCR method. Similarly, $v_k^{(\ell-1)}$, $\mathbf{u}_k^{e,(\ell-1)}$, $\mathbf{U}_k^{(\ell-1)}$ are defined to respectively correspond to $w_k^{(\ell-1)}$, $\mathbf{f}_k^{e,(\ell-1)}$, $\mathbf{F}_k^{(\ell+1)}$ in the constraint $(\mathbf{f}_k^{e,(\ell-1)})^H \mathbf{F}_k^{(\ell)} \mathbf{f}_k^{e,(\ell-1)} \geq w_k^{(\ell-1)} Tr \mathbf{F}_k^{(\ell)}$), $\forall k$, to approximate the rank-one constraint rank$(U_k)=1, \forall k$ as:

$$\left(u_k^{eig(\ell-1)}\right)^H U_k^{(\ell)} u_k^{eig(\ell-1)} \geq v_k^{(\ell-1)} Tr\left(U_k^{(\ell)}\right), \forall k$$

The binary constraint on $\alpha_m$ is equivalently transformed into the following two continuous constraints:

$$\alpha_m - \alpha_m^2 \leq 0, 0 \leq \alpha_m \leq 1$$

However, the constraint $-\alpha_m^2$ is still non-convex due to the non-convex term $\alpha_m - \alpha_m^2 \leq 0$. The constraint is processed through SCA. Specifically, an upper bound of any feasible point $\{\alpha_m^{(\ell)}\}$ in $\ell^{th}$ iteration is as follows:

$$\left(-\alpha_m^2\right)^{ub} = -2\alpha_m^{(\ell)} \alpha_m + \left(\alpha_m^{(\ell)}\right)^2$$

To process the highly coupled constraint $[U_k]_{m,m} = \alpha_m^2 \beta_m^k, \forall m, k$, an auxiliary variable $\eta_m^k + \alpha_m^2 \beta_m^k$ is introduced such that the following equivalent form of $[U_k]_{m,m} = \alpha_m^2 \beta_m^k, \forall m, k$ can be obtained:

$$[U_k]_{m,m} = \eta_m^k, \eta_m^k = \alpha_m^2 \beta_m^k$$

Next, the constraint $\eta_m^k = \alpha_m^2 \beta_m^k$ is processed through a penalty function-based method. If the constraint is directly added as a penalty term to the objective function $$\max_{U_k, \Delta_1} \sum_k \sum_{j \in J_k} Q_{kj},$$

the objective function becomes $\Sigma_k \Sigma_{j \in J_k} Q_{kj} - \rho \Sigma_k \Sigma_m (\alpha_m^2 \beta_m^k - \eta_m^k)$, where $\rho > 0$ represents a penalty factor. The obtained objective function is non-concave due to the non-convex term $\alpha_m^2 \beta_m^k$. The objective function is replaced by its CUB. A function $$g(\alpha_m, \beta_m^k) = \alpha_m^2 \beta_m^k, G(\alpha_m, \beta_m^k) = \frac{c_m^k}{2}\alpha_m^4 + \frac{(\beta_m^k)^2}{2c_m^k}$$

is defined. For $c_m^k > 0$, $G(\alpha_m, \beta_m^k)$ is a CUB of $g(\alpha_m, \beta_m^k)$. When $$c_m^k = \frac{\beta_m^k}{\alpha_m^2},$$

equations $g(\alpha_m, \beta_m^k) = G(\alpha_m, \beta_m^k)$ and $\nabla g(\alpha_m, \beta_m^k) = \nabla G(\alpha_m, \beta_m^k)$ hold, where $\nabla g(\alpha_m, \beta_m^k)$ represents a gradient of $g(\alpha_m, \beta_m^k)$. Finally, the original problem is reformulated as:

$$\max_{U_k, \Delta_1, \eta_m^k} \sum_k \sum_{j \in J_k} Q_{kj} - \rho \tilde{G}(\alpha_m, \beta_m^k, \eta_m^k)$$

s.t. $0 \leq \alpha_m \leq 1$, $\alpha_m + \left(-\alpha_m^2\right)^{ub} \leq 0, \forall m$, $[U_k]_{m,m} = \eta_m^k, \forall m, k$, $U_k \succeq 0, \beta_m^k \in [0, \beta_{max}], \sum_k \beta_m^k \leq \beta_{max}, \forall m, k$, $[U_k]_{M+1,M+1} = 1, \forall k$, $\Gamma_{kj} \geq A_{kj}^{-1} B_{kj}^{-1}, \Gamma_{kj} \leq \Gamma_{kl}^{lb}, Q_{kj}, \leq R_{kj}^{lb}, Q_{kj} \geq R_{kj}^{min}, \forall k \in K, \forall j \in J_k, \forall l \in L_k$, $C_m \geq \exp(-a(\zeta_m - q)) + 1, \forall m$, $\zeta_m \leq Tr\left(T_m H\left(\sum_k F_k\right)H^H T_m^H\right) + \sigma_s^2(1-\alpha_m) \forall m$, $A_{kj}^{-1} \leq Tr(\tilde{H}_{kj}F_k\tilde{H}_{kj}^H U_k), B_{kj} \geq Tr\left((\tilde{H}_{kj}F_{\bar{k}}\tilde{H}_{kj}^H + \tilde{G}_{kj})U_k\right) + \sigma_u^2,$ $C_{kj} \geq Tr(\tilde{H}_{kj}F_k\tilde{H}_{kj}^H U_k)P_{kj} + B_{kj}, \bar{W} \geq \sum_k Tr(\tilde{H} U_k)$ -continued $$(u_k^{eig,(\ell-1)})^H U_k^{(\ell)} u_k^{eig,(\ell-1)} \geq v_k^{(\ell-1)} Tr(U_k^{(\ell)}), \forall k$$

$$\tilde{G}(\alpha_m, \beta_m^k, \eta_m^k) = \sum_k \sum_m \left( \frac{c_m^k}{2} \alpha_m^4 + \frac{(\beta_m^k)^2}{2c_m^k} - \eta_m^k \right).$$

When $\rho \to \infty$, a solution to the foregoing problem satisfies $\tilde{G}(\alpha_m, \beta_m^k, \eta_m^k)=0$. The problem is an SDP problem, which can be effectively solved through CVX. The given point $c_m^k$ in the $\ell^{th}$ iteration is updated based on $$(c_m^k)^{(\ell)} = \frac{(\beta_m^k)^{(\ell-1)}}{(\alpha_m^{(\ell-1)})^2}.$$

A proposed penalty-based algorithm is described in detail below.

The algorithm for solving the problem based on a penalty function includes: Initialize feasible points $\{U_k^{(0)}, v_k^{(0)}\}$, $\varepsilon > 1$, and a step $\delta_2^{(0)}$, and set an iteration index $\ell_2 = 0$ and a maximum value of the penalty factor $\rho_{max}$. Repeat the following steps: If $\ell_2 \leq \ell_2^{max}$ and the original problem is solvable, solve the problem to update $U_k^{(\ell_2+1)}$, and update $\delta_2^{(\ell_2+1)} = \delta_2^{(\ell_2)}$; otherwise, update $$\delta_2^{(\ell_2+1)} = \frac{\delta_2^{(\ell_2)}}{2}.$$

Update $$v_k^{(\ell_2+1)} = \min\left(1, \frac{\lambda_{max}(U_k^{(\ell_2+1)})}{Tr(U_k^{(\ell_2+1)})} + \delta_2^{(\ell_2+1)}\right).$$

If $\rho^{(\ell_2+1)} = \min\{\varepsilon \rho^{(\ell_2)}, \rho_{max}\}$, update $\ell_2 = \ell_2 + 1$ and end the current iteration. Otherwise, reinitialize $U_k^{(0)}$ and let $\varepsilon > 1$ and $\ell_2 = 0$ until the stop criterion is satisfied.

S5: For the MF-RIS deployment optimization problem in S2, because a LOS component including a position variable of the MF-RIS is nonlinear, the position of the MF-RIS is designed through a local area optimization method, and a non-convex term is processed through SCA to transform the MF-RIS deployment optimization problem into a solvable convex problem. It can be ensured that each sub-algorithm converges to a local optimum.

Finally, the present disclosure focuses on a position optimization problem of the MF-RIS. It can be learned from the expression of the original problem that distance-independent variables $L_{bs}$ and $L_{skj}$ and LOS components $H^{LoS}$ and $g_{kj}^{LoS}$ are all related to the position w of the MF-RIS. However:

$$H^{LoS} \left[1, e^{-j\frac{2\pi}{\lambda} d\sin\varphi_{bs}\sin\vartheta_{bs}}, \ldots, e^{-j\frac{2\pi}{\lambda}(M_z-1)d\sin\varphi_{bs}\sin\vartheta_{bs}}\right]^T \otimes$$

$$\left[1, e^{-j\frac{2\pi}{\lambda} d\cos\varphi_{bs}\sin\vartheta_{bs}}, \ldots, e^{-j\frac{2\pi}{\lambda}(M_y-1)d\cos\varphi_{bs}\sin\vartheta_{bs}}\right]^T$$

The foregoing expression reveals that the LOS components are non-linear with respect to W and are difficult to directly process. In view of this, w is designed through the local area optimization method. Specifically, $w^{(i-1)}$ represents a feasible position of the MF-RIS obtained in an $(i-1)^{th}$ iteration. The position variable should satisfy the following constraint:

$$\|w - w^{(i-1)}\| \leq \delta,$$

A constant $\delta$ is small such that the position of the MF-RIS in the $(i-1)^{th}$ iteration can be used to approximate $H^{LoS}$ and $g_{kj}^{LoS}$ in an $i^{th}$ iteration. It is assumed that $\hat{H}^{(i-1)}$ and $\hat{g}_{kj}^{(i-1)}$ are obtained in the $(i-1)^{th}$ iteration. Then, the constraints are rewritten as:

$$A_{kj}^{-1} \leq d_{kj}^T D_{kj} F_k D_{kj}^H d_{kj},$$

$$B_{kj} \geq d_{kj}^T D_{kj} F_{\bar{k}} D_{kj}^H d_{kj} + d_{skj}^{-\kappa_{skj}} W_1^{(i-1)} + \sigma_u^2,$$

$$C_{kj} \geq d_{kj}^T D_{kj} F_k D_{kj}^H d_{kj} P_{kj} + B_{kj},$$

$$d_{bs}^{\kappa_{bs}} \geq W_2^{(i-1)},$$

$$d_{bs}^{\kappa_{bs}} \leq W_3^{(i-1)},$$

where $$d_{kj} = \left[1, d_{bs}^{-\frac{\kappa_{bs}}{2}} d_{skj}^{-\frac{\kappa_{skj}}{2}}\right]^T,$$

$$D_{kj} = \left[h_{kj}, h_0(\hat{H}^{(i-1)})^H \Theta_k^H \hat{g}_{kj}^{(i-1)}\right]^H,$$

$$W_1^{(i-1)} = h_0 |(\hat{g}_{kj}^{(i-1)})^H \Theta_k n_s|^2,$$

$$W_2^{(i-1)} = \frac{h_0 \sum_k Tr\left(\Theta_k \hat{H}^{(i-1)} \left(\sum_k F_k\right) (\hat{H}^{(i-1)})^H \Theta_k^H\right)}{\bar{W} - \sigma_s^2 \sum_k Tr(\Theta_k \Theta_k^H)},$$

$$W_3^{(i-1)} = \frac{h_0 Tr\left(T_m \hat{H}^{(i-1)} \left(\sum_k F_k\right) (\hat{H}^{(i-1)})^H T_m^H\right)}{\zeta_m - \sigma_s^2 (1 - \alpha_m)}.$$

Therefore, given $\{f_k, \Theta_k\}$, the problem is simplified to:

$$\max_{w, \Delta_1} \sum_k \sum_{j \in J_k} Q_{kj}$$

s.t.

$$w \in P = \{[x, y, z]^T \mid x_{min} \leq x \leq x_{max}, y_{min} \leq y \leq y_{max}, z_{min} \leq z \leq z_{max}\},$$

$$\Gamma_{kj} \geq A_{kj}^{-1} B_{kj}^{-1},$$

$$\Gamma_{kj} \leq \Gamma_{kl}^{lb},$$

$$Q_{kj} \leq R_{kj}^{lb},$$

$$Q_{kj} \geq R_{kj}^{min},$$

$$\forall k \in K,$$

$$\forall j \in J_k,$$

$$\forall l \in L_k,$$

$$C_m \geq \exp(-a(\zeta_m - q)) + 1,$$

$$\forall m,$$

$$\|w - w^{(i-1)}\| \leq \delta,$$

-continued $$A_{kj}^{-1} \le d_{kj}^T D_{kj} F_k D_{kj}^H d_{kj},$$

$$B_{kj} \ge d_{kj}^T D_{kj} F_{\bar{k}} D_{kj}^H d_{kj} + d_{skj}^{-\kappa_{skj}} W_1^{(i-1)} + \sigma_u^2,$$

$$C_{kj} \ge d_{kj}^T D_{kj} F_k D_{kj}^H d_{kj} P_{kj} + B_{kj},$$

$$? d_{bs}^{\kappa_{bs}} \ge W_2^{(i-1)},$$

$$d_{bs}^{\kappa_{bs}} \le W_3^{(i-1)},$$

The following constraints are still non-linear and non-convex with respect to w:

$$A_{kj}^{-1} \le d_{kj}^T D_{kj} F_k D_{kj}^H d_{kj},$$

$$B_{kj} \ge d_{kj}^T D_{kj} F_{\bar{k}} D_{kj}^H d_{kj} + d_{skj}^{-\kappa_{skj}} W_1^{(i-1)} + \sigma_u^2,$$

$$C_{kj} \ge d_{kj}^T D_{kj} F_k D_{kj}^H d_{kj} P_{kj} + B_{kj},$$

$$d_{bs}^{\kappa_{bs}} \ge W_2^{(i-1)},$$

$$d_{bs}^{\kappa_{bs}} \le W_3^{(i-1)},$$

The foregoing constraints are still non-linear and non-convex with respect to w. To solve this problem, an auxiliary variable set is introduced to replace complex terms, and a non-convex part is approximated through SCA. Specifically, a relaxation variable set $\Delta_2 = \{t, t_{kj}, \bar{t}_{kj}, e_{kj}, v, \bar{v}, r^{kj}, \bar{r}_{kj}, s_{kj}\}$ is introduced and $\bar{d}_{kj} = [1, \bar{t}_{kj}]^T$ is defined to linearly approximate the constraints as:

$$\bar{t}_{kj} \le t t_{kj},$$

$$\bar{r}_{kj} \ge \bar{d}_{kj}^T \hat{H}_{kj} F_k \hat{H}_{kj}^H \bar{d}_{kj},$$

$$s_{kj} \ge \bar{d}_{kj}^T \hat{H}_{kj} F_{\bar{k}} \hat{H}_{kj}^H \bar{d}_{kj},$$

$$A_{kj}^{-1} \le r_{kj},$$

$$B_{kj} \ge s_{kj} + e_{kj} W_1^{(i-1)} + \sigma_u^2,$$

$$C_{kj} \ge \bar{r}_{kj} P_{kj} + B_{kj},$$

$$v \ge W_2^{(i-1)},$$

$$\bar{v} \le W_3^{(i-1)},$$

$$r_{kj} \le -\left(\bar{d}_{kj}^{(\ell)}\right)^T \hat{H}_{kj} F_k \hat{H}_{kj}^H \bar{d}_{kj}^{(\ell)} + 2\Re\left(\left(\bar{d}_k^{(\ell)}\right)^T \hat{H}_{kj} F_k \hat{H}_{kj}^H \bar{d}_{kj}\right),$$

$$x^2 + x_b^2 + y^2 + y_b^2 + z^2 + z_b^2 - 2x_b x - 2y_b y - 2z_b z + \left(-t^{-\frac{4}{\kappa_{bs}}}\right)^{ub} \le 0,$$

$$x^2 + x_{kj}^2 + y^2 + y_{kj}^2 + z^2 + z_{kj}^2 - 2x_{kj} x - 2y_{kj} y + \left(-t_{kj}^{-\frac{4}{\kappa_{skj}}}\right)^{ub} \le 0,$$

$$(-x^2)^{ub} - x_{kj}^2 + (-y^2)^{ub} - y_{kj}^2 + (-z^2)^{ub} + 2x_{kj} x + 2y_{kj} y + (e_{kj})^{-\frac{2}{\kappa_{skj}}} \le 0,$$

$$(-x^2)^{ub} - x_b^2 + (-y^2)^{ub} - y_b^2 +$$
$$(-z^2)^{ub} - z_b^2 + 2x_b x + 2y_b y + 2z_b z + \left(v^{\frac{2}{\kappa_{bs}}}\right)^{ub} \le 0,$$

$$x^2 + x_b^2 + y^2 + y_b^2 + z^2 + z_b^2 - 2x_b x - 2y_b y - 2z_b z + \left(-\bar{v}^{\frac{2}{\kappa_{bs}}}\right)^{ub} \le 0,$$

$$\left(-t^{-\frac{4}{\kappa_{bs}}}\right)^{ub} = -(t^{(\ell)})^{-\frac{4}{\kappa_{bs}}} + \frac{4}{\kappa_{bs}} (t^{(\ell)})^{-\frac{4}{\kappa_{bs}}-1} (t - t^{(\ell)}),$$

$$\left(-t_{kj}^{-\frac{4}{\kappa_{skj}}}\right)^{ub} = -(t_{kj}^{(\ell)})^{-\frac{4}{\kappa_{skj}}} + \frac{4}{\kappa_{skj}} (t_{kj}^{(\ell)})^{-\frac{4}{\kappa_{skj}}-1} (t_{kj} - t_{kj}^{(\ell)}),$$

$$\left(v^{\frac{2}{\kappa_{bs}}}\right)^{ub} = (v^{(\ell)})^{\frac{2}{\kappa_{bs}}} + \frac{4}{\kappa_{bs}} (v^{(\ell)})^{\frac{2}{\kappa_{bs}}-1} (v - v^{(\ell)}),$$

$$(-x^2)^{ub} = (x^{(\ell)})^2 - 2x^{(\ell)} x,$$

$$(-y^2)^{ub} = (y^{(\ell)})^2 - 2y^{(\ell)} y,$$

$$(-z^2)^{ub} = (z^{(\ell)})^2 - 2z^{(\ell)} z,$$

$\{\bar{d}_{kj}^{(\ell)}, t^{(\ell)}, t_{k,}^{(\ell)}, v^{(\ell)}, x^{(\ell)}, y^{(\ell)}, z^{(\ell)}\}$ are feasible points obtained in the $\ell^{th}$ iteration.

A proof of the foregoing formula is as follows:

The relaxation variable set $\Delta_2 = \{t, t_{kj}, \bar{t}_{kj}, e_{kj}, v, \bar{v}, r_{kj}, \bar{r}_{kj}, s_{kj}\}$ is defined as:

$$t = d_{bs}^{\frac{\kappa_{bs}}{2}},$$

$$t_{kj} = d_{skj}^{\frac{\kappa_{skj}}{2}},$$

$$\bar{t}_{kj} = t t_{kj},$$

$$e_{kj} = d_{skj}^{-\kappa_{skj}},$$

$$v = \bar{v} = d_{bs}^{\kappa_{bs}},$$

$$r_{kj} = \bar{r}_{kj} = \bar{d}_{kj}^T \hat{H}_{kj} F_k \hat{H}_{kj}^H \bar{d}_{kj},$$

$$s_{kj} = \bar{d}_{kj}^T \hat{H}_{kj} F_{\bar{k}} \hat{H}_{kj}^H \bar{d}_{kj}$$

Then, the following constraints are rewritten:

$$A_{kj}^{-1} \le d_{kj}^T D_{kj} F_k D_{kj}^H d_{kj},$$

$$B_{kj} \ge d_{kj}^T D_{kj} F_{\bar{k}} D_{kj}^H d_{kj} + d_{skj}^{-\kappa_{skj}} W_1^{(i-1)} + \sigma_u^2,$$

$$C_{kj} \ge d_{kj}^T D_{kj} F_k D_{kj}^H d_{kj} P_{kj} + B_{kj},$$

$$d_{bs}^{\kappa_{bs}} \ge W_2^{(i-1)},$$

$$d_{bs}^{\kappa_{bs}} \le W_3^{(i-1)},$$

The foregoing constraints are rewritten as:

$$t \le d_{bs}^{\frac{\kappa_{bs}}{2}},$$

$$t_{kj} \le d_{skj}^{\frac{\kappa_{skj}}{2}},$$

$$e_{kj} \ge d_{skj}^{\kappa_{skj}},$$

$$v \le d_{bs}^{\kappa_{bs}},$$

$$\bar{v} \ge d_{bs}^{\kappa_{bs}},$$

$$r_{kj} \le \bar{d}_{kj}^T \hat{H}_{kj} F_k \hat{H}_{kj}^H \bar{d}_{kj},$$

$$\bar{t}_{kj} \le t t_{kj},$$

$$\bar{r}_{kj} \ge \bar{d}_{kj}^T \hat{H}_{kj} F_k \hat{H}_{kj}^H \bar{d}_{kj},$$

$$s_{kj} \ge \bar{d}_{kj}^T \hat{H}_{kj} F_{\bar{k}} \hat{H}_{kj}^H \bar{d}_{kj},$$

$$A_{kj}^{-1} \le r_{kj},$$

$$B_{kj} \ge s_{kj} + e_{kj} W_1^{(i-1)} + \sigma_u^2,$$

$$C_{kj} \ge \bar{r}_{kj} P_{kj} + B_{kj},$$

-continued $$v \geq W_2^{(i-1)},$$
$$\overline{v} \leq W_3^{(i-1)}.$$

Because the constraints $$t = d_{bs}^{\frac{\kappa_{bs}}{2}},$$
$$t_{kj} = d_{skj}^{\frac{\kappa_{skj}}{2}},$$
$$\overline{t}_{kj} = tt_{kj},$$
$$e_{kj} = d_{skj}^{\kappa_{skj}},$$
$$v = \overline{v} = d_{bs}^{\kappa_{bs}}$$

are still non-convex, they are processed through SCA. A right-hand term of the constraint $r_{kj} \leq \overline{d}_{kj}^T \hat{H}_{kj} F_k \hat{H}_{kj}^H \overline{d}_{kj}$ is convex with respect to $\overline{d}_{kj}^T$. A lower bound of the right-hand term at the given point $\overline{\mathbf{d}}_{kj}^{(\ell)}$ is obtained through first-order Taylor expansion as follows:

$$-(\overline{d}_{kj}^{(\ell)})^T \hat{H}_{kj} F_k \hat{H}_{kj}^H \overline{d}_{kj}^{(\ell)} + 2\mathcal{R}\left((\overline{d}_{kj}^{(\ell)})^T \hat{H}_{kj} F_k \hat{H}_{kj}^H \overline{d}_{kj}\right)$$

Therefore, the constraint $r_{kj} \leq \overline{d}_{kj}^T \hat{H}_{kj} F_k \hat{H}_{kj}^H \overline{d}_{kj}$ is rewritten as the following convex constraint:

$$r_{kj} \leq -(\overline{d}_{kj}^{(\ell)})^T \hat{H}_{kj} F_k \hat{H}_{kj}^H \overline{d}_{kj}^{(\ell)} + 2\mathcal{R}\left((\overline{d}_{kj}^{(\ell)})^T \hat{H}_{kj} F_k \hat{H}_{kj}^H \overline{d}_{kj}\right),$$

To facilitate subsequent derivation of the other constraints, they are rewritten as follows:

$$x^2 + x_b^2 + y^2 + y_b^2 + z^2 + z_b^2 - 2x_b x - 2y_b y - 2z_b z + t^{-\frac{4}{\kappa_{bs}}} \leq 0,$$
$$x^2 + x_{kj}^2 + y^2 + y_{kj}^2 + z^2 - 2x_{kj} x - 2y_{kj} y - t^{-\frac{4}{\kappa_{skj}}} \leq 0,$$
$$-x^2 - x_{kj}^2 - y^2 - y_{kj}^2 - z^2 + 2x_{kj} x - 2y_{kj} y + e_{kj}^{-\frac{2}{\kappa_{skj}}} \leq 0,$$
$$-x^2 - x_b^2 - y^2 - y_b^2 - z^2 - z_b^2 + 2x_b x + 2y_b y + 2z_b z + v^{\frac{2}{\kappa_{bs}}} \leq 0,$$
$$x^2 + x_b^2 + y^2 + y_b^2 + z^2 + z_b^2 - 2x_b x - 2y_b y - 2z_b z - \overline{v}^{\frac{2}{\kappa_{bs}}} \leq 0,$$

The non-convex terms $$-t^{-\frac{4}{\kappa_{bs}}}, -t_{kj}^{-\frac{4}{\kappa_{skj}}}, v^{\frac{2}{\kappa_{bs}}}, -x^2, -y^2, -z^2$$

lead to non-convexity of the constraints. To solve this problem, an auxiliary variable set is introduced to replace the SCA method to obtain upper bounds of $$-t^{-\frac{4}{\kappa_{bs}}}, -t_{kj}^{-\frac{4}{\kappa_{skj}}}, v^{\frac{2}{\kappa_{bs}}}, -x^2, -y^2, -z^2$$

at feasible points $\{t^{(\ell)}, t_{kj}^{(\ell)}, v^{(\ell)}, x^{(\ell)}, y^{(\ell)}, z^{(\ell)}\}$.

$$\left(-t^{-\frac{4}{\kappa_{bs}}}\right)^{ub} = -(t^{(\ell)})^{-\frac{4}{\kappa_{bs}}} + \frac{4}{\kappa_{bs}}(t^{(\ell)})^{-\frac{4}{\kappa_{bs}}-1}(t - t^{(\ell)}),$$
$$\left(-t_{kj}^{-\frac{4}{\kappa_{skj}}}\right)^{ub} = -(t_{kj}^{(\ell)})^{-\frac{4}{\kappa_{skj}}} + \frac{4}{\kappa_{skj}}(t_{kj}^{(\ell)})^{-\frac{4}{\kappa_{skj}}-1}(t_{kj} - t_{kj}^{(\ell)}),$$
$$\left(v^{\frac{2}{\kappa_{bs}}}\right)^{ub} = (v^{(\ell)})^{\frac{2}{\kappa_{bs}}} + \frac{2}{\kappa_{bs}}(v^{(\ell)})^{\frac{2}{\kappa_{bs}}-1}(v - v^{(\ell)}),$$
$$(-x^2)^{ub} = (x^{(\ell)})^2 - 2x^{(\ell)} x,$$
$$(-y^2)^{ub} = (y^{(\ell)})^2 - 2y^{(\ell)} y,$$
$$(-z^2)^{ub} = (z^{(\ell)})^2 - 2z^{(\ell)} z,$$

Finally, the non-convex terms are replaced by their respective convex approximations to obtain the following convex constraints:

$$x^2 + x_b^2 + y^2 + y_b^2 + z^2 + z_b^2 - 2x_b x - 2y_b y - 2z_b z + \left(-t^{-\frac{4}{\kappa_{bs}}}\right)^{ub} \leq 0,$$
$$x^2 + x_{kj}^2 + y^2 + y_{kj}^2 + z^2 - 2x_{kj} x - 2y_{kj} y + \left(-t_{kj}^{-\frac{4}{\kappa_{skj}}}\right)^{ub} \leq 0,$$
$$(-x^2)^{ub} - x_{kj}^2 + (-y^2)^{ub} - y_{kj}^2 + (-z^2)^{ub} + 2x_{kj} x + 2y_{kj} y + (e_{kj})^{-\frac{2}{\kappa_{skj}}} \leq 0,$$
$$(-x^2)^{ub} - x_b^2 + (-y^2)^{ub} - y_b^2 +$$
$$(-z^2)^{ub} - z_b^2 + 2x_b x + 2y_b y + 2z_b z + \left(v^{\frac{2}{\kappa_{bs}}}\right)^{ub} \leq 0,$$
$$x^2 + x_b^2 + y^2 + y_b^2 + z^2 + z_b^2 - 2x_b x - 2y_b y - 2z_b z + \left(-\overline{v}^{\frac{2}{\kappa_{bs}}}\right)^{ub} \leq 0,$$

The proof is completed.
Next:

$$r_{kj} \leq -(\overline{d}_{kj}^{(\ell)})^T \hat{H}_{kj} F_k \hat{H}_{kj}^H \overline{d}_{kj}^{(\ell)} + 2\mathcal{R}\left((\overline{d}_{kj}^{(\ell)})^T \hat{H}_{kj} F_k \hat{H}_{kj}^H \overline{d}_{kj}\right),$$
$$x^2 + x_b^2 + y^2 + y_b^2 + z^2 + z_b^2 - 2x_b x - 2y_b y - 2z_b z + \left(-t^{-\frac{4}{\kappa_{bs}}}\right)^{ub} \leq 0,$$
$$x^2 + x_{kj}^2 + y^2 + y_{kj}^2 + z^2 - 2x_{kj} x - 2y_{kj} y + \left(-t_{kj}^{-\frac{4}{\kappa_{skj}}}\right)^{ub} \leq 0,$$
$$(-x^2)^{ub} - x_{kj}^2 + (-y^2)^{ub} - y_{kj}^2 + (-z^2)^{ub} + 2x_{kj} x + 2y_{kj} y + (e_{kj})^{-\frac{2}{\kappa_{skj}}} \leq 0,$$
$$(-x^2)^{ub} - x_b^2 + (-y^2)^{ub} - y_b^2 +$$
$$(-z^2)^{ub} - z_b^2 + 2x_b x + 2y_b y + 2z_b z + \left(v^{\frac{2}{\kappa_{bs}}}\right)^{ub} \leq 0,$$
$$x^2 + x_b^2 + y^2 + y_b^2 + z^2 + z_b^2 - 2x_b x - 2y_b y - 2z_b z + \left(-\overline{v}^{\frac{2}{\kappa_{bs}}}\right)^{ub} \leq 0,$$

The following non-convex constraints are replaced by the foregoing convex constraints:

$$A_{kj}^{-1} \leq d_{kj}^T D_{kj} F_k D_{kj}^H d_{kj},$$
$$B_{kj} \geq d_{kj}^T D_{kj} F_{\overline{k}} D_{kj}^H d_{kj} + d_{skj}^{-\kappa_{skj}} W_1^{(i-1)} + \sigma_u^2,$$
$$C_{kj} \geq d_{kj}^T D_{kj} F_k D_{kj}^H d_{kj} P_{kj} + B_{kj},$$
$$d_{bs}^{\kappa_{bs}} \geq W_2^{(i-1)},$$

-continued
$$d_{bs}^{K_{bs}} \leq W_3^{(i-1)},$$

The original problem is reformulated as the following optimization problem:

$$\max_{w, \Delta_1} \sum_k \sum_{j \in J_k} Q_{kj}$$

s.t.

$$w \in P = \{[x, y, z]^T \mid x_{min} \leq x \leq x_{max}, y_{min} \leq y \leq y_{max}, z_{min} \leq z \leq z_{max}\},$$

$$\Gamma_{kj} \geq A_{kj}^{-1} B_{kj}^{-1},$$

$$\Gamma_{kj} \leq \Gamma_{kl}^{lb},$$

$$Q_{kj} \leq R_{kj}^{lb},$$

$$Q_{kj} \geq R_{kj}^{min},$$

$$\forall k \in K,$$

$$\forall j \in J_k,$$

$$\forall l \in L_k,$$

$$C_m \geq \exp(-a(\zeta_m - q)) + 1,$$

$$\forall m,$$

$$\|w - w^{(i-1)}\| \leq \delta,$$

$$r_{kj} \leq -\left(\bar{d}_{kj}^{(\ell)}\right)^T \hat{H}_{kj} F_k \hat{H}_{kj}^H \bar{d}_{kj}^{(\ell)} + 2\Re\left(\left(\bar{d}_{kj}^{(\ell)}\right)^T \hat{H}_{kj} F_k \hat{H}_{kj}^H \bar{d}_{kj}\right),$$

$$x^2 + x_b^2 + y^2 + y_b^2 + z^2 + z_b^2 - 2x_b x - 2y_b y - 2z_b z + \left(-t^{-\frac{4}{K_{bs}}}\right)^{ub} \leq 0,$$

$$x^2 + x_{kj}^2 + y^2 + y_{kj}^2 + z^2 - 2x_{kj}x - 2y_{kj}y + \left(-t_{kj}^{-\frac{4}{K_{sk_j}}}\right)^{ub} \leq 0,$$

$$(-x^2)^{ub} - x_{kj}^2 + (-y^2)^{ub} - y_{kj}^2 + (-z^2)^{ub} + 2x_{kj}x + 2y_{kj}y + (e_{kj})^{-\frac{2}{K_{sk_j}}} \leq 0,$$

$$(-x^2)^{ub} - x_b^2 + (-y^2)^{ub} - y_b^2 +$$
$$(-z^2)^{ub} - z_b^2 + 2x_b x + 2y_b y + 2z_b z + \left(v^{-\frac{2}{K_{bs}}}\right)^{ub} \leq 0,$$

$$x^2 + x_b^2 + y^2 + y_b^2 + z^2 + z_b^2 - 2x_b x - 2y_b y - 2z_b z + \left(-v^{-\frac{2}{K_{bs}}}\right)^{ub} \leq 0,$$

The problem is a convex problem and can be effectively solved through CVX. A proposed local area-based algorithm is described in detail below.

The algorithm for solving the problem based on a local area includes:

Initialize feasible points $\{w^{(0)}, t^{(0)}, t_{kj}^{(0)}, v^{(0)}\}$. Set an iteration index $\ell_3 = 0$, Repeat the following steps: Solve the problem to update $\{w^{(\ell_3+1)}, t^{(\ell_3+1)}, t_{kj}^{(\ell_3+1)}, v^{(\ell_3+1)}\}$, and update $\ell_3 = \ell_3 + 1$ until a stop criterion is satisfied.

Figure 2:
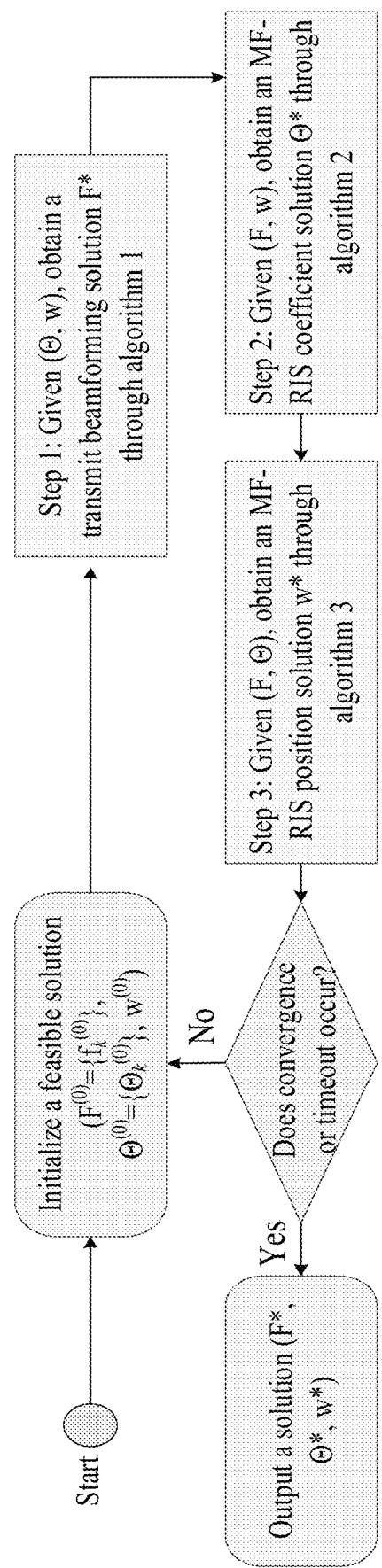
FIG. 2 is a flowchart of an AO algorithm according to an embodiment of the present disclosure.

Based on the foregoing algorithms, a flowchart of an AO algorithm for solving the optimization problem is shown in FIG. 2. Because each sub-algorithm converges to its local optimum, it is ensured that the entire AO algorithm converges.

The foregoing embodiments are used only to describe the technical solutions of the present disclosure, and are not intended to limit same. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions of the embodiments of the present disclosure.

What is claimed is:

1. A multi-functional reconfigurable intelligence surface (MF-RIS) integrating signal reflection, refraction and amplification and energy harvesting, having two working modes, namely an energy harvesting mode and a signal relay mode, wherein in the signal relay mode, an incident signal is reflected and refracted through surface equivalent electrical impedance and magnetoimpedance elements, the incident signal is divided into a first part and a second part by controlling electric current and magnetic current through a microcontroller unit (MCU) chip, the first part is reflected to reflection half-space and the second part is refracted to refraction half-space, and a reflected signal and a refracted signal are amplified through an amplifier circuit; in the energy harvesting mode, radio frequency (RF) energy is obtained from the incident signal and converted into direct current (DC) power through an impedance matcher, an RF-DC conversion circuit and a capacitor, and an energy management module controls energy to be stored in an energy storage apparatus or supplied for operation of a phase shifter and the amplifier circuit; and a circuit connection is adjusted such that each element is flexibly switched between the energy harvesting mode and the signal relay mode.

2. An application method of the MF-RIS integrating signal reflection, refraction and amplification and energy harvesting according to claim 1 in a multi-user wireless network, comprising the following steps:
   S1: designing operation modes and parameters, comprising base station (BS) transmit beamforming, and different components and a deployment position of the MF-RIS, and constructing a mixed integer non-linear programming non-convex optimization problem and constraints with an objective of maximizing an achievable sum rate (SR) of all users;
   S2: decomposing the non-convex problem constructed in S1 into three subproblems: a BS transmit beamforming optimization problem, an MF-RIS coefficient design problem, and an MF-RIS deployment optimization problem; and
   S3: performing alternating optimization (AO) on the subproblems obtained through decomposition in S2 to ensure that each sub-algorithm converges to a local optimum, which comprises: for the BS transmit beamforming optimization problem, introducing auxiliary variables and solving the BS transmit beamforming optimization problem through a sequential rank-one constraint relaxation (SROCR) method; for the MF-RIS coefficient design problem, introducing an auxiliary variable, replacing a non-convex objective function with a convex upper bound (CUB) of the non-convex objective function, processing an equality constraint through a penalty function method, and designing a coefficient of the MF-RIS; and for the MF-RIS deployment optimization problem, designing the position of the MF-RIS through a local area optimization method, and processing a non-convex term through successive convex approximation (SCA) to transform the MF-RIS deployment optimization problem into a solvable convex problem.

3. The application method of the MF-RIS integrating signal reflection, refraction and amplification and energy harvesting in the multi-user wireless network according to claim 2, wherein the optimization problem and the constraints in S1 are as follows:

$$\max_{f_k, \Theta_k, w} \sum_k \sum_{j \in J_k} R_{j \to j}^k$$

s.t.

$$\sum_k \|f_k\|^2 \le P_{BS}^{max},$$

$$\Theta_k \in R_{MF},$$

$$\forall k \in K,$$

$$R_{j \to j}^k \ge R_{kj}^{min},$$

$$\forall k \in K,$$

$$\forall j \in J_k,$$

$$w \in P = \{[x, y, z]^T \mid x_{min} \le x \le x_{max}, y_{min} \le y \le y_{max}, z_{min} \le z \le z_{max}\},$$

$$\frac{|\bar{h}_{kj} f_k|^2}{|\bar{h}_{kj} f_{\bar{k}}|^2 + |g_{kj}^H \Theta_k n_s|^2 + \sigma_u^2} \le \frac{|\bar{h}_{kl} f_k|^2}{|\bar{h}_{kl} f_{\bar{k}}|^2 + |g_{kl}^H \Theta_k n_s|^2 + \sigma_u^2},$$

$$\forall k \in K,$$

$$\forall j \in J_k,$$

$$\forall l \in L_k,$$

$$R_{l \to j}^k \ge R_{j \to j}^k,$$

$$\forall k \in K,$$

$$\forall j \in J_k,$$

$$\forall l \in L_k$$

$$2(P_b + P_{DC}) \sum_m \alpha_m + \left(M - \sum_m \alpha_m\right) P_C + \xi P_O \le \sum_m P_m^A,$$

wherein a quantity of elements of the MF-RIS is M, a set of the elements of the MF-RIS is indexed as M={1, . . . , M}, and m is an $m^{th}$ element in the set of the elements; a quantity of antennas is J, a space set is K={r,t}, a user set is J={1, 2, . . . , J}, j is a $j^{th}$ element in the user set, $J_k$={1, 2, . . . , $J_k$} represents a user set in space K, $J_r \cup J_t$=J, and if k=t, $\bar{k}$=r; if k=r, $\bar{k}$=t, and a user j in the space K is indexed as $U_{kj}$; $\bar{h}_{kj}$=$h_{kj}^H$+$g_{kj}^H \Theta_k H$ represents a combined channel vector from a BS to the user $U_{kj}$, $\Theta_k$ is the coefficient of the MF-RIS, and $R_{MF}$ is a feasible coefficient set of the MF-RIS; $R_{j \to j}^k$ is an achievable rate of an expected signal of the user $U_{kj}$, $R_{kj}^{min}$ represents a minimum quality of service requirement of the user $U_{kj}$, $f_k$ is a transmit beamforming vector of the space k, $P_{BS}^{max}$ represents maximum transmit power of the BS, P represents a predefined deployment area of the MF-RIS, considering a three-dimensional (3D) Cartesian coordinate system, positions of the BS, the MF-RIS, and the user $U_{kj}$ are respectively $w_b$=$[x_b, y_b, z_b]^T$, w=[x, y, z]$^T$, and $w_{kj}$=$[x_{kj}, y_{kj}, 0]^T$, and [$x_{min}, x_{max}$], [$y_{min}, y_{max}$], and [$z_{min}, z_{max}$] respectively represent candidate ranges along X, Y, and Z axes; $n_s \sim$CN (0,$\sigma_s^2 I_M$) represents amplified noise introduced at the MF-RIS with noise power $\sigma_s^2$ per unit, and $n_{kj} \sim$CN (0,$\sigma_u^2$) represents additive white Gaussian noise (AWGN) at the user $U_{kj}$ with power $\sigma_u^2$; a constant $a_m$ represents impact of a circuit sensitivity limitation on the $m^{th}$ element, and $P_b$, $P_{DC}$, $P_C$ respectively represent power consumed by each phase shifter, DC bias power consumed by the amplifier circuit, and power consumed by the RF-DC conversion circuit; and $\xi$ is a reciprocal of an energy conversion coefficient, and $P_O$=$\Sigma_k(\|\Theta_k H \Sigma_k f_k\|^2 + \sigma_s^2 \|\Theta_k I_M\|^2)$ represents output power of the MF-RIS.

4. The application method of the MF-RIS integrating signal reflection, refraction and amplification and energy harvesting in the multi-user wireless network according to claim 3, wherein decomposing the non-convex problem into the three subproblems in S2 comprises:

removing the constraint $R_{l \to j}^k \ge R_{j \to j}^k$, $\forall k \in K$, $\forall j \in J_k$, $\forall l \in L_k$, from the non-convex problem;

introducing a relaxation variable set $\Delta_0$={$A_{kj}, B_{kj}, \Gamma_{kj}, C_m, \zeta_m$} such that:

$$A_{kj}^{-1} = |\bar{h}_{kj} f_k|^2,$$

$$B_{kj} = |\bar{h}_{kj} f_{\bar{k}}|^2 + |g_{kj}^H \Theta_k n_s|^2 + \sigma_u^2,$$

$$\Gamma_{kj} = A_{kj}^{-1} B_{kj}^{-1},$$

$$\sum_m C_m^{-1} = (W + \xi P_O)(1 - \Omega)Z^{-1} + M\Omega,$$

$$\zeta_m = P_m^{RF}$$

rewriting the constraints as:

$$A_{kj}^{-1} \le |\bar{h}_{kj} f_k|^2,$$

$$B_{kj} \ge |\bar{h}_{kj} f_{\bar{k}}|^2 + |g_{kj}^H \Theta_k n_s|^2 + \sigma_u^2,$$

$$\Gamma_{kj} \ge A_{kj}^{-1} B_{kj}^{-1},$$

$$\forall k \in K,$$

$$\forall j \in J_k,$$

$$\Gamma_{kj} \le A_{kl}^{-1} B_{kl}^{-1},$$

$$\forall k \in K,$$

$$\forall j \in J_k,$$

$$\forall l \in L_k,$$

$$(W + \xi P_O)(1 - \Omega)Z^1 + M\Omega \le \sum_m C_m^{-1},$$

$$\zeta_m \le P_m^{RF},$$

$$C_m \ge \exp(-a(\zeta_m - q)) + 1,$$

$$\forall m,$$

wherein W=2($P_b$+$P_{DC}$)$\Sigma_m \alpha_m$+(M−$\Sigma_m \alpha_m$)$P_C$; and processing the non-convex constraints in the foregoing second formula through SCA; and performing first-order Taylor expansion to obtain lower bounds of right-hand terms of $A_{kl}^{-1} B_{kl}^{-1}$ and $\Sigma_m C_m^{-1}$ at feasible points { $A_{kl}^{(\ell)}$, $B_{kl}^{(\ell)}$, $C_m^{(\ell)}$ } in a $\ell^{th}$ iteration as follows:

$$\Gamma_{kl}^{lb} = \frac{1}{A_{kl}^{(\ell)} B_{kl}^{(\ell)}} - \frac{A_{kl} - A_{kl}^{(\ell)}}{(A_{kl}^{(\ell)})^2 B_{kl}^{(\ell)}} - \frac{B_{kl} - B_{kl}^{(\ell)}}{(B_{kl}^{(\ell)})^2 A_{kl}^{(\ell)}},$$

$$C^{lb} = \sum_m \left(\frac{2}{C_m^{(\ell)}} - \frac{C_m}{(C_m^{(\ell)})^2}\right)$$

wherein in this way, the non-convex problem is decomposed into the three subproblems: the BS transmit beamforming optimization problem, the MF-RIS coefficient design problem, and the MF-RIS deployment optimization problem.

5. The application method of the MF-RIS integrating signal reflection, refraction and amplification and energy harvesting in the multi-user wireless network according to claim 4, wherein in S3, for the BS transmit beamforming optimization problem, given $\{\Theta_k, w\}$, auxiliary variables $Q_{kj}$ and $C_{kj}$ are introduced to transform an objective function $$\max_{f_k, \Theta_k, w} \sum_k \sum_{j \in J_k} R_{j \to j}^k, \; Q_{kj} = R_{j \to j}^k$$

and $C_{kj} = |\bar{h}_{kj} f_k|^2 P_{kj} + B_{kj}$, the non-convex constraint $Q_{kj} \leq \log_2(1 + p_{kj} A_{kj}^{-1} C_{kj}^{-1})$ is processed through SCA, a lower bound of a right-hand term of the non-convex constraint is obtained in the $\ell^{th}$ iteration, $\overline{H}_{kj} = \bar{\mathbf{h}}_{kj}^H \bar{\mathbf{h}}_{kj}$ and $F_k = k_k f_k^H$ are defined, $F_k \succeq 0$ and rank$(F_k) = 1$, an auxiliary variable set $$\Delta_1 = \{A_{kj}, B_{kj}, C_{kj}, Q_{kj}, \Gamma_{kj}, C_{kj}, \zeta_m\}$$

and $$\overline{W} = \frac{(C^{lb} - M\Omega)Z}{(1-\Omega)\xi} - \frac{W}{\xi}$$

are introduced such that $\overline{W} \geq \Sigma_k \; \text{Tr}(\Theta_k(H(\Sigma_k F_k)H^H + \sigma_s^2 I_M) \Theta_k^H)$, a rank-one constraint rank$(F_k)=1$, $\forall k$ is replaced by a linear constraint $(\mathbf{f}_k^{e,(\ell-1)})^H \mathbf{F}_k^{(\ell)} \mathbf{f}_k^{e,(\ell-1)} \geq w_k^{(\ell-1)} \text{Tr}(\mathbf{F}_k^{(\ell)})$, $\forall k$, through the SROCR method, $w_k^{(\ell-1)} \in [0, 1]$ is a trace ratio parameter of $F_k$ in a $(\ell-1)^{th}$ iteration, $\mathbf{f}_k^{e,(\ell-1)}$ is an eigenvector corresponding to a maximum eigenvalue of $\mathbf{F}_k^{(\ell-1)}$, $\mathbf{F}_k^{(\ell-1)}$ is a solution of $w_k^{(\ell-1)}$ in the $(\ell-1)^{th}$ iteration, and the BS transmit beamforming optimization problem is transformed into a convex semidefinite programming (SDP) problem.

6. The application method of the MF-RIS integrating signal reflection, refraction and amplification and energy harvesting in the multi-user wireless network according to claim 5, wherein an algorithm for solving the convex SDP problem into which the BS transmit beamforming optimization problem is transformed comprises: initializing feasible points $\{F_k^{(0)}, w_k^{(0)}\}$ and a step $\delta_1^{(0)}$, setting an iteration index $\ell_1 = 0$, and repeating the following steps until a stop criterion is satisfied: if the convex SDP problem is solvable, solving the convex SDP problem to update $\mathbf{F}_k^{(\ell-1)}$, and updating $\delta_1^{(\ell_1-1)} = \delta_1^{(\ell_1)}$; otherwise, updating $$\delta_1^{(\ell_1+1)} = \frac{\delta_1^{(\ell_1)}}{2};$$

and updating $$w_k^{(\ell_1+1)} = \min\left(1, \frac{\lambda_{max}\left(F_k^{(\ell_1+1)}\right)}{Tr\left(F_k^{(\ell_1+1)}\right)} + \delta_1^{(\ell_1+1)}\right)$$

and $\ell_1 = \ell_1 + 1$, and ending the current iteration.

7. The application method of the MF-RIS integrating signal reflection, refraction and amplification and energy harvesting in the multi-user wireless network according to claim 4, wherein in S3, for the MF-RIS coefficient design problem, given $\{f_k, w\}$, $H_{kj} = [\text{diag}(g_{kj}^H)]$, $v_k = [\alpha_1 \sqrt{\beta_1^k} e^{j\theta_1^k}, \alpha_2 \sqrt{\beta_2^k} e^{j\theta_2^k}, \ldots, \alpha_M \sqrt{\beta_M^k} e^{j\theta_M^k}]^H$, and $u_k = [v_k; 1]$ are defined; and $U_k = u_k u_k^H$ is defined, $U_k \succeq 0$, rank$(U_k) = 1$, $[U]_{m,m} = \alpha_m^2 \beta_m^k$, $[U_k]_{M+1, M+1} = 1$, and the following equation is obtained:

$$|\bar{h}_{kj} f_{kj}|^2 = |(h_{kj}^H + g_{kj}^H \Theta_k H) f_k|^2 = Tr(H_{kj} F_k H_{kj}^H U_k)$$

similarly, $|g_{kj}^H \Theta_k n_s|^2 = \text{Tr}(G_{kj} U_k)$ and $P_O = \Sigma_k \text{Tr}(HU_k)$ are obtained;

the constraints on $A_{kj}, B_{kj}, C_{kj}, \overline{W}$ are rewritten as:

$$A_{kj}^{-1} \leq Tr\left(\tilde{H}_{kj} F_k \tilde{H}_{kj}^H U_k\right),$$

$$B_{kj} \geq Tr\left(\left(\tilde{H}_{kj} F_{\overline{k}} \tilde{H}_{kj}^H + \tilde{G}_{kj}\right) U_k\right) + \sigma_u^2,$$

$$C_{kj} \geq Tr\left(\tilde{H}_{kj} F_k \tilde{H}_{kj}^H U_k\right) P_{kj} + B_{kj},$$

$$\overline{W} \geq \sum_k Tr(\tilde{H} U_k)$$

a rank-one constraint rank$(U_k)=1$, $\forall k$ is approximated as $(\mathbf{u}_k^{eig,(\ell-1)})^H \mathbf{U}_k^{(\ell)} \mathbf{u}_k^{eig,(\ell-1)} \geq v_k^{(\ell-1)} \text{Tr} \mathbf{U}_k^{(\ell)}$, $\forall k$, and a binary constraint $\alpha_m \in \{0, 1\}$, $\forall m$ is equivalently transformed into $\alpha_m - \alpha_m^2 \leq 0$, $0 \leq \alpha_m \leq 1$; and the constraint $\alpha_m - \alpha_m^2 \leq 0$ is processed through SCA; and an auxiliary variable $\eta_m^k = \alpha_m^2 \beta_m^k$ is introduced, and a non-convex constraint $[U_k]_{m,m} = \alpha_m^2 \beta_m^k$, $\forall m, k$ is equivalently represented as $[U_k]_{m,m} = \eta_m^k$, $\eta_m^k = \alpha_m^2 \beta_m^k$, and the equality constraint $\eta_m^k = \alpha_m^2 \beta_m^k$ is processed through a penalty function to transform the MF-RIS coefficient design problem into a penalty function method-based problem.

8. The application method of the MF-RIS integrating signal reflection, refraction and amplification and energy harvesting in the multi-user wireless network according to claim 7, wherein an algorithm for solving the penalty function method-based problem comprises: initializing feasible points $\{U_k^{(0)}, v_k^{(0)}\} \varepsilon > 1$, and a step $\delta_2^{(0)}$, and setting an iteration index $\ell_2 = 0$ and a maximum value of a penalty factor $\rho_{max}$; and repeating the following steps: if $\ell_2 \leq \ell_2^{max}$ and the penalty function method-based problem is solvable, solving the penalty function method-based problem to update $U_k^{(\ell_2+1)}$, and updating $\delta_2^{(\ell_2+1)} = \delta_2^{(\ell_2)}$; otherwise, updating $\delta_2^{(\ell_2+1)} = \frac{\delta_2^{(\ell_2)}}{2}$; updating $$v_k^{(\ell_2+1)} = \min\left(1, \frac{\lambda_{max}\left(U_k^{(\ell_2+1)}\right)}{Tr\left(U_k^{(\ell_2+1)}\right)} + \delta_2^{(\ell_2+1)}\right);$$

and if $\rho^{(\ell_2+1)_2+1)} = \min\{\varepsilon \rho^{(\ell_2)_2)}, \rho_{max}\}$, updating $\ell_2 = \ell_2 + 1$ and ending the current iteration; otherwise, reinitializing $U_k^{(0)}$ and letting $\varepsilon > 1$ and $\ell_2 = 0$ until a stop criterion is satisfied.

9. The application method of the MF-RIS integrating signal reflection, refraction and amplification and energy harvesting in the multi-user wireless network according to claim 4, wherein in S3, for the MF-RIS deployment optimization problem, the position w of the MF-RIS is designed through the local area optimization method, $w^{(i-1)}$ is defined as a position of the MF-RIS obtained in an $(i-1)^{th}$ iteration, and a position variable satisfies a constraint $\|w-w^{(i-1)}\| \leq \delta$; it is assumed that $\hat{H}^{(i-1)}$ and $\hat{g}_{kj}^{(i-1)}$ are obtained in the $(i-1)^{th}$ iteration, $\hat{H}^{(i-1)}$ and $\hat{g}_{kj}^{(i-1)}$ are respectively an array response and small-scale fading after the $(i-1)^{th}$ iteration from the BS to the MF-RIS and from the MF-RIS to the user $U_{kj}$, and a constraint comprising $A_{kj}$, $B_{kj}$, $C_{kj}$, $d_{bs}^{Kbs}$, $d_{bs}^{Kbs}$ is re-expressed; an auxiliary variable set is introduced to replace complex terms of the constraint, and a non-convex part of the constraint is approximated through SCA; and a right-hand term of a non-convex constraint $r_{kj} \leq \bar{d}_{kj}^T \hat{H}_{kj} F_k \hat{H}_{kj}^H \bar{d}_{kj}$ is a convex term with respect to $\bar{d}_{kj}^T$, the constraint $r_{kj} \leq \bar{d}_{kj}^T \hat{H}_{kj} F_k \hat{H}_{kj}^H \bar{d}_{kj}$ is rewritten as a convex constraint $r_{kj} \leq -\bar{d}_{kj}^{(\ell)T} \hat{H}_{kj} F_k \hat{H}_{kj}^H \bar{d}_{kj}^{(\ell)} + 2\Re((\bar{d}_{kj}^{(\ell)})^T \hat{H}_{kj} F_k \hat{H}_{kj}^H d_{kj})$, through first-order Taylor expansion, and $\bar{d}_{kj}^{(\ell)}$ is a feasible point in the $\ell^{th}$ iteration.

10. The application method of the MF-RIS integrating signal reflection, refraction and amplification and energy harvesting in the multi-user wireless network according to claim 9, wherein an algorithm for solving the local area-based problem comprises: initializing feasible points $\{w^{(0)}, t^{(0)}, t_{kj}^{(0)}, v^{(0)}\}$ and setting an iteration index $\ell_3=0$; and repeating the following steps: solving the problem to update $\{w^{(\ell_3+1)}, t_{kj}^{(\ell_3+1)}, t^{(\ell_3+1)}, v^{(\ell_3+1)}\}$, and updating $\ell_3 = \ell_3+1$ until a stop criterion is satisfied.

* * * * *